(12) United States Patent
Sullivan et al.

(10) Patent No.: US 10,701,458 B2
(45) Date of Patent: *Jun. 30, 2020

(54) METHODS AND APPARATUS TO CALCULATE GRANULAR DATA OF A REGION BASED ON ANOTHER REGION FOR MEDIA AUDIENCE MEASUREMENT

(71) Applicant: The Nielsen Company (US), LLC, New York, NY (US)

(72) Inventors: Jonathan Sullivan, Hurricane, UT (US); Michael Sheppard, Brooklyn, NY (US); Peter Lipa, Tucson, AZ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,381

(22) Filed: Jun. 28, 2019

(65) Prior Publication Data

US 2019/0394536 A1    Dec. 26, 2019

Related U.S. Application Data

(63) Continuation of application No. 14/921,921, filed on Oct. 23, 2015, now Pat. No. 10,356,485.

(51) Int. Cl.
*H04N 21/81*    (2011.01)
*H04N 21/258*    (2011.01)
(Continued)

(52) U.S. Cl.
CPC ........... *H04N 21/812* (2013.01); *G06Q 10/00* (2013.01); *G06Q 30/02* (2013.01);
(Continued)

(58) Field of Classification Search
CPC ....... H04N 21/25883; H04N 21/25833; H04N 21/25841; H04N 21/25891; H04N 21/42201
See application file for complete search history.

(56) References Cited

U.S. PATENT DOCUMENTS 6,108,637 A    8/2000 Blumenau
7,139,723 B2    11/2006 Conkwright et al.
(Continued)

OTHER PUBLICATIONS

Garland et al., "Different From You and Me", Print and Digital Research Forum, 2013, [http://www.pdrf.net/wp-content/uploads/2013/11/46GarlandLazarus.pdf], retrieved on Apr. 23, 2015 (28 pages).

(Continued)

*Primary Examiner* — Pankaj Kumar
*Assistant Examiner* — Timothy R Newlin
(74) *Attorney, Agent, or Firm* — Hanley, Flight & Zimmerman, LLC

(57) ABSTRACT

Methods and apparatus to calculate granular data of a region based on another region for media audience measurement are disclosed. An example method for calculating, via a processor, granular data of a region includes determining aggregate behavioral data associated with a media audience measurement of a target region. The example method includes determining, via the processor, aggregate demographics data of the target region. The example method includes determining, via the processor, granular data of a source region. The example method includes calculating, via the processor, granular data of the target region to measure a media audience of the target region by apportioning the aggregate demographics data and the aggregate behavioral data of the target region based on the granular data of the source region.

20 Claims, 10 Drawing Sheets

(51) Int. Cl.
*H04N 21/442* (2011.01)
*G06Q 30/02* (2012.01)
*G06Q 10/00* (2012.01)

(52) U.S. Cl.
CPC ... *G06Q 30/0201* (2013.01); *H04N 21/25883* (2013.01); *H04N 21/44204* (2013.01); *H04N 21/44222* (2013.01)

(56) References Cited

U.S. PATENT DOCUMENTS

| | | | |
|---|---|---|---|
| 7,146,329 | B2 | 12/2006 | Conkwright et al. |
| 7,194,421 | B2 | 3/2007 | Conkwright et al. |
| 7,197,472 | B2 | 3/2007 | Conkwright et al. |
| 8,151,194 | B1 | 4/2012 | Chan et al. |
| 8,290,800 | B2 | 10/2012 | Law et al. |
| 8,341,009 | B1 | 12/2012 | Algranati |
| 8,370,489 | B2 | 2/2013 | Mazumdar et al. |
| 8,504,507 | B1 | 8/2013 | Srinivasaiah |
| 8,543,523 | B1 | 9/2013 | Palit et al. |
| 8,694,359 | B2 | 4/2014 | Algranati |
| 8,887,188 | B2 | 11/2014 | Hadfield et al. |
| 9,015,750 | B2 | 4/2015 | Knee et al. |
| 9,092,805 | B2 | 7/2015 | Dittus |
| 9,800,928 | B2 * | 10/2017 | Sheppard ......... H04N 21/44218 |
| 10,091,547 | B2 | 10/2018 | Sheppard et al. |
| 10,356,485 | B2 | 7/2019 | Sullivan et al. |
| 10,433,008 | B2 | 10/2019 | Sheppard et al. |
| 2005/0246391 | A1 * | 11/2005 | Gross ..................... G06F 16/958 |
| 2006/0287916 | A1 | 12/2006 | Starr et al. |
| 2007/0271518 | A1 | 11/2007 | Tischer et al. |
| 2008/0059988 | A1 | 3/2008 | Lee et al. |
| 2008/0097950 | A1 * | 4/2008 | Kobayashi ............. G06Q 30/02 706/52 |
| 2008/0300965 | A1 | 12/2008 | Doe |
| 2010/0057560 | A1 | 3/2010 | Skudlark et al. |
| 2010/0211462 | A1 | 8/2010 | Nowacek |
| 2013/0159499 | A1 | 6/2013 | Besehanic |
| 2013/0198125 | A1 * | 8/2013 | Oliver ................ G06Q 30/0246 706/46 |
| 2013/0262181 | A1 | 10/2013 | Topchy et al. |
| 2013/0262636 | A1 | 10/2013 | Yuh et al. |
| 2014/0013345 | A1 | 1/2014 | Vinson et al. |
| 2014/0313188 | A1 | 10/2014 | Cohen et al. |
| 2015/0089523 | A1 | 3/2015 | Volovich et al. |
| 2015/0186536 | A1 | 7/2015 | Bosworth et al. |
| 2015/0334458 | A1 * | 11/2015 | Srinivasan ........... H04N 21/482 725/14 |
| 2016/0203211 | A1 * | 7/2016 | Milton .................... H04L 51/20 705/14.58 |

OTHER PUBLICATIONS

Abernethy et al., "Online Collaborative Filtering," University of California at Berkeley, Technical Report, 2007, (9 Pages).

D'Ambosio et al., "Robust Tree-Based Incremental Imputation Method for Data Fusion", Advances in Intelligent Data Analysis VII, 2007, (10 pages).

Cbonline, "Community Broadcasting Database: Survey of the Community Radio Sector, 2007-2008 Financial Period", Nov. 2009, (42 pages).

Robilliard et al., "Reconciling Household Surveys and National Accounts Data Using a Cross Entropy Estimation Method," Review of Income and Wealth, Series 49, No. 3, Sep. 2003, (12 pages).

Rubinstein, "Semi-Interative Minimum Cross-Entropy Algorithms for Rare-Events, Counting, Combinatorial and Integer Programming", Methodology and Computing in Applied Probability, 10, p. 121-178, 2008, (59 pages).

United States Patent and Trademark Office, "Non-Final Office Action," issued in connection with U.S. Appl. No. 15/055,257, dated Nov. 4, 2016, 5 pages.

United States Patent and Trademark Office, "Non-Final Office Action," issued in connection with U.S. Appl. No. 15/055,257, dated Mar. 3, 2017, 5 pages.

United States Patent and Trademark Office, "Notice of Allowance," issued in connection with U.S. Appl. No. 15/055,257, dated Jun. 22, 2017, 15 pages.

United States Patent and Trademark Office, "Non-Final Office Action," issued in connection with U.S. Appl. No. 15/787,521, dated Feb. 26, 2018, 7 pages.

United States Patent and Trademark Office, "Notice of Allowance," issued in connection with U.S. Appl. No. 15/787,521, dated May 18, 2018, 5 pages.

United States Patent and Trademark Office, "Non-Final Office Action," issued in connection with U.S. Appl. No. 16/146,926, dated Jan. 14, 2019, 5 pages.

United States Patent and Trademark Office, "Notice of Allowance," issued in connection with U.S. Appl. No. 16/146,926, dated May 8, 2019, 7 pages.

United States Patent and Trademark Office, "Non-Final Office Action," issued in connection with U.S. Appl. No. 14/921,921, dated Jul. 13, 2018, 5 pages.

United States Patent and Trademark Office, "Final Office Action," issued in connection with U.S. Appl. No. 14/921,921, dated Nov. 14, 2018, 5 pages.

United States Patent and Trademark Office, "Notice of Allowance," issued in connection with U.S. Appl. No. 14/921,921, dated Mar. 6, 2019, 5 pages.

* cited by examiner

METHODS AND APPARATUS TO CALCULATE GRANULAR DATA OF A REGION BASED ON ANOTHER REGION FOR MEDIA AUDIENCE MEASUREMENT

RELATED APPLICATION

This patent arises from a continuation of U.S. patent application Ser. No. 14/921,921, filed on Oct. 23, 2015 and entitled "METHODS AND APPARATUS TO CALCULATE GRANULAR DATA OF A REGION BASED ON ANOTHER REGION FOR MEDIA AUDIENCE MEASUREMENT." U.S. patent application Ser. No. 14/921,921 is hereby incorporated by reference in its entirety. Priority to U.S. patent application Ser. No. 14/921,921 is claimed.

FIELD OF THE DISCLOSURE

This disclosure relates generally to audience measurement, and, more particularly, to calculating granular data of a region based on another region for media audience measurement.

BACKGROUND

Audience measurement entities often collect demographic information (e.g., age, race, gender, income, education level, etc.) of a population by having members of the population complete a survey (e.g., door-to-door, mail, online, etc.).

Some audience measurement entities or other entities also collect behavioral data (e.g., viewing data and/or tuning data for television programming, advertising, movies, etc.) from households of a population (e.g., upon obtaining consent from the households). In some instances, the audience measurement entities collect viewing data (e.g., data related to media viewed by a member of the household) from each member of the household. To identify which household member is exposed to displayed media, the audience measurement entities often employ meters (e.g., personal people meters) to monitor the members and/or media presentation devices (e.g., televisions) of the household.

Some audience measurement entities may also collect tuning data from media presentation device (e.g., set-top boxes) of households of a population. For example, the media presentation device may record tuning data that is associated with tuning events of the media presentation device (e.g., turning a set-top box on or off, changing a channel, changing a volume), and the audience measurement entities may associate the collected tuning data with information associated with the household at which the media presentation device is located.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
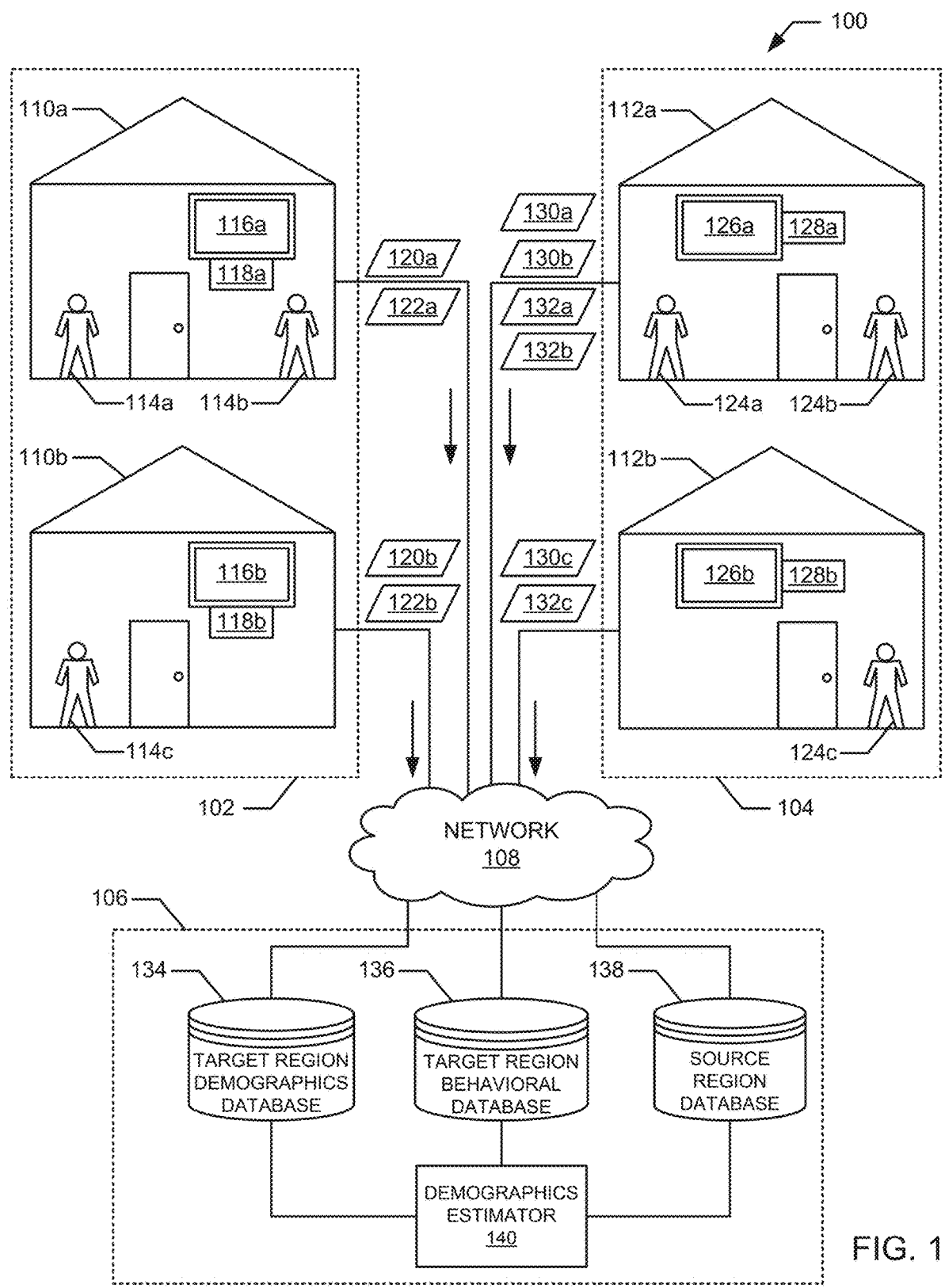
FIG. 1 is a block diagram of an example environment in which aggregate data of a target region and granular data of a source region may be collected to calculate granular data of the target region in accordance with the teachings of this disclosure.

Audience measurement entities (AMEs) and other entities measure composition and size of audiences consuming media to produce ratings of the media. Ratings may be used by advertisers and/or marketers to develop strategies and plans to purchase advertising space and/or in designing advertising campaigns. Additionally, media producers and/or distributors may use the ratings to determine how to set prices for advertising space and/or to make programming decisions. To measure the composition and size of an audience, AMEs (e.g., The Nielsen Company (US), LLC®) track audience members' exposure to media and associate demographics data, demographics information and/or demographics of the audience members (e.g., age, gender, race, education level, income, etc.) with the exposed media. Demographics data of an audience member and/or an audience associated with exposed media may include a plurality of characteristics of the audience member and/or the audience as a whole.

As used herein, a demographic characteristic in demographics data is referred to as a "demographic dimension." For example, demographic dimensions may include age, gender, age and gender, income, race, nationality, geographic location, education level, religion, etc. A demographic dimension may include, be made up of and/or be divided into different groupings.

As used herein, each grouping of a demographic dimension is referred to as a "demographic marginal" (also referred to herein as a "demographic group" and/or a "demographic bucket"). For example, a "gender" demographic dimension includes a "male" demographic marginal and a "female" demographic marginal.

As used herein, a "demographic constraint" refers to a demographic marginal or a combination of independent demographic marginals of interest (e.g., a combination of demographic marginals of different respective demographic dimensions, demographic joint-marginals or distributions). An example demographic constraint includes a marginal from an "age/gender" demographic dimension. Another example demographic constraint includes a combination of a marginal from a race demographic dimension, a marginal from an "age/gender" demographic dimension, and a marginal from an "education level" demographic dimension (e.g., a Latina, 18-45 year-old male, and a master's degree).

To obtain demographics data of audience members and associate exposed media with demographics data of its audience, AMEs often enlist panelists and/or panelist households to participate in measurement panels. In some such examples, media exposure and/or demographics data associated with the panelists is collected and used to project a size and demographic makeup of a population. The panelists provide demographics data to the AMEs via, for example, self-reporting to the AMEs, responses to surveys, consenting to the AMEs obtaining demographics data from database proprietors (e.g., Facebook, Twitter, Google, Yahoo!, MSN, Apple, Experian, etc.), etc.

In some audience measurement systems, panelists consent to AMEs or other entities collecting exposure data by measuring exposure of the panelists to media (e.g., television programming, radio programming, online content, programs, advertising, etc.). As used herein, "exposure data" refers to information pertaining to media exposure events presented via a media presentation device (e.g., a television, a stereo, a speaker, a computer, a portable device, a gaming console, an online media presentation device, etc.) of a household (e.g., a panelist household) and associated with a person and/or a group of persons of the household (e.g., panelist(s), member(s) of the panelist household). For example, exposure data includes information indicating that a panelist is exposed to particular media if the panelist is present in a room in which the media is being presented. To enable the AMEs to collect such exposure data, the AMEs typically provide panelists and/or panelist households with meter(s) that monitor media presentation devices (e.g., televisions, stereos, speakers, computers, portable devices, gaming consoles, and/or online media presentation devices, etc.).

Enlisting and retaining panelists for audience measurement can be a difficult and costly process for AMEs. For example, AMEs must carefully select and screen panelists for particular characteristics so that a population of the panelists is representative of the population as a whole. Further, panelists must diligently perform specific tasks to enable the collected demographics and exposure data to accurately reflect the panelist activities. For example, to identify that a panelist is exposed to a particular media, some AMEs provide the panelist and/or panelist household with a meter (e.g., a people meter) that monitors media presentation devices of the corresponding panelist household. A people meter is an electronic device that is typically positioned in a media access area (e.g., an exposure area such as a living room of the panelist household) and is proximate to and/or carried by one or more panelists.

In some examples, the cost of selecting, monitoring, and analyzing enough panelists to produce a sufficiently representative subsection of a region (e.g., a city, a county, etc.) may be substantial. As a result, the costs incurred to monitor panelists of small regions (e.g., low population-density regions, small cities, etc.) may be prohibitively expensive for an AME to produce media exposure and/or demographics data for such regions. Accordingly, AMEs often elect to enlist and monitor panelists and, thus, collect media exposure and/or demographics data for only the largest and/or most densely-populated regions.

Further, some households which are otherwise desirable for AMEs may elect not to be a panelist household. For example, some household members do not want to interact with a people meter before being exposed to media. For example, based on one or more triggers (e.g., a channel change of a media presentation device or an elapsed period of time), some people meters generate a prompt for panelists to provide presence and/or identity information by depressing a button of the people meter. Although periodically inputting information in response to a prompt may not be burdensome when required for a short period of time, some people find the prompting and data input tasks to be intrusive and annoying over longer periods of time.

Because collecting information from panelists can be difficult and costly, AMEs and other entities interested in measuring media/audiences have begun to collect information from people and/or households that are not traditional panelists via other sources such as data collected by set-top boxes and/or over-the-top devices (e.g., a Roku media device, an Apple TV media device, a Samsung TV media device, a Google TV media device, a Chromecast media device, an Amazon TV media device, a gaming console, a smart TV, a smart DVD player, an audio-streaming device, etc.). A set-top box (STB) is a device that converts source signals into media presented via a media presentation device. In some examples, the STB implements a digital video recorder (DVR) and/or a digital versatile disc (DVD) player. Some media presentation devices such as televisions, STBs and over-the-top devices are capable of recording tuning data for media presentation.

As used herein, "tuning data" refers to information pertaining to tuning events (e.g., a STB being turned on or off, channel changes, volume changes, tuning duration times, etc.) of a media presentation device of a household that is not associated with demographics data (e.g., number of household members, age, gender, race, etc.) of the household and/or members of the household. To collect the tuning data of a media presentation device, consent is often obtained from the household members for such data acquisition (e.g., via a third-party media provider and/or manufacturer, the AME, etc.). Many people are willing to provide tuning data via a media presentation device, because personalized information is not collected by the media presentation device and repeated actions are not required of the household members. As used herein, people that consent to collection of tuning data (e.g., via a media presentation device), but do not consent (and/or are not asked to consent) to collection of exposure data (e.g., media exposure data that is tied to a particular person such as a panelist) and/or demographics data, are referred to as "non-panelists." While collecting tuning data from non-panelists can greatly increase the amount collected data about media presentation and/or exposure, the lack of exposure data and/or demographic data reduces the value of this collected data.

To increase the value of tuning data collected from non-panelists in measuring the composition and size of audiences exposed to media in a region, methods and apparatus disclosed herein enable AMEs (or any other entity) to calculate granular data of a region of interest (e.g., a target region, a region of non-panelists) based on aggregate behavioral data (e.g., aggregate tuning data) of the region of interest, aggregate demographics data of the region of interest, and granular data of another region (e.g., a source region, a region of panelists).

As used herein, a "region of panelists," a "panelist region," and a "source region" refer to a geographic region (e.g., a neighborhood, a township, a city, a county, etc.) that includes panelists from which data (e.g., demographics data, behavioral data) is collected to estimate granular data of that region. An example panelist region is a city (e.g., Milwaukee, Wis.) that includes panelists from which an AME and/or other entity collects demographic data (e.g., age, gender, income, highest-level education, political affiliation) and behavioral data (e.g., tuning data, viewing data, online activity data, purchasing data, etc.) to estimate the granular data for the city.

As used herein, "granular data," "granular demographics," and "granular demographics data" refer to demographics data and behavioral data of a region (e.g., a panelist region, a non-panelist region) that indicate a relationship between demographic constraints of the demographics data and behavioral constraints of the behavioral data of the region. For example, granular data identify a count or percentage of members of the region satisfying a demographic constraint of interest that also satisfy a behavioral constraint of interest. For example, granular data may indicate that a region's audience for Sunday Night Football (i.e., a behavioral constraint) includes 30% of members of a region satisfying a "young female" demographic constraint, 10% of members of the region satisfying an "old female" demographic constraint, 40% of members of a region satisfying a "young male" demographic constraint, and 20% of members of the region satisfying an "old male" demographic constraint viewed.

As used herein, a "region of non-panelists," a "non-panelist region," and a "target region" refer to a geographic region (e.g., a neighborhood, a township, a city, a county, etc.) that includes non-panelists from which non-person-specific aggregate data (e.g., aggregate behavioral data, aggregate demographics data) is collected. An example non-panelist region is a city (e.g., Kenosha, Wis.) that includes non-panelists from which an AME and/or other entity collects aggregate demographic data (e.g., age, gender, income, highest-level education, political affiliation) and aggregate behavioral data (e.g., tuning data, viewing data, online activity data, purchasing data, etc.) of the region.

As used herein, "aggregate behavioral data" refers to non-person-specific data of a region (e.g., a non-panelist region) that indicates a count and/or percentage of members of the region satisfying behavioral constraint(s) of interest. Example aggregate behavioral data of a region includes aggregate tuning data collected from set-top boxes and/or over-the-top devices of households within the region that are associated with tuning events of a corresponding media presentation device, the set-top box (e.g., turning a set-top box on or off, changing a channel, changing a volume), the over-the-top device, etc.

As used herein, a "behavioral constraint" refers to an event of interest (e.g., a tuning event, an exposure event) associated with a member (e.g., a panelist, a non-panelist) and/or a group of members of a region (e.g., a panelist region, a non-panelist region). An example behavioral constraint includes media events tuned or exposed to members of a region. For example, behavioral constraints include tuning to and/or viewing a channel (e.g., ABC) and/or a program (e.g., Perfect Strangers) at a particular time (8:00 P.M. on Friday).

As used herein, "aggregate demographics data" and "aggregate demographics" refer to non-person-specific data of a region (e.g., a non-panelist region) that indicates a count and/or percentage of members of the region that satisfy demographic constraint(s) of interest. The aggregate demographics data of a region may be collected via a survey-based census (e.g. a government-funded census, a privately-funded census) of the region.

Example methods and apparatus disclosed herein calculate granular data for a non-panelist region based on aggregate demographics data and aggregate behavioral data of the non-panelist region and granular data of a panelist region. For example, an AME (or any other entity) obtains aggregate demographics data of the non-panelist region that indicates a count or percentage of members of the non-panelist region that satisfy demographic constraints of interest (e.g., a "young female" demographic constraint, an "old male" demographic constraint, etc.). Further, the example AME obtains aggregate behavioral data of the non-panelist region that indicates a count or percentage of members of the non-panelist region that satisfy behavioral constraints of interest (e.g., a "Seinfeld" behavioral constraint, an "A Different World" behavioral constraint, etc.). Further, the example AME obtains granular data of the panelist region that indicates a count or percentage of panelists satisfying the demographic constraints of interest that also satisfy the behavioral constraints of interest (e.g., a percentage of panelists satisfying the "young female" demographic constraint that also satisfy the "Seinfeld" behavioral constraint, a percentage of panelists satisfying the "old male" demographic constraint that also satisfy the "A Different World" behavioral constraint, etc.).

Based on the obtained data of the non-panelist region and the panelist region, the example AME calculates granular data of the non-panelist region by calculating a count or percentage of the non-panelist region members satisfying the demographic constraints of interest that also satisfy the behavioral constraints of interest. As a result, the example methods and apparatus disclosed herein enable AMEs and/or other entities to estimate granular data for a region in which no panelists are employed by utilizing census data and tuning data associated with that region. Thus, the example methods and apparatus enable an AMEs and/or other entity to obtain granular data of a region that may be used to produce audience measurement ratings for that region without having to enlist and monitor panelists within that region. Accordingly, by obtaining granular data of regions while reducing a number of regions in which panelists are enlisted and monitored, the example methods and apparatus disclosed herein reduce processing resources utilized by computer networked data collection systems to meter regions and/or to transmit collected data of the metered regions.

To calculate the granular data of the non-panelist region, the example AME determines whether there is a linear relationship between the aggregate demographics data and the aggregate behavioral data (e.g., aggregate tuning data) of the non-panelist region. For behavioral constraints of the aggregate behavioral data having a linear relationship with the aggregate demographics data, the example AME calculates granular data for those behavioral constraints based on the linear relationship.

For behavioral constraints of the aggregate behavioral data that do not have a linear relationship with the aggregate demographics data, the example AME performs non-linear optimization to calculate granular data for those behavioral constraints. For example, the AME defines optimization constraints based on the aggregate demographics data and the aggregate behavioral data associated with the corresponding demographic constraints, constructs an optimization framework based on the granular data of the panelist region associated with the corresponding demographic constraints, and performs the non-linear optimization based on the optimization constraints and the optimization framework to calculate the granular data for those behavioral constraints. In some examples, the AME calculates an optimization parameter that represents a variance based on the calculated granular data of the non-panelist region and the granular data of the panelist region.

Additionally or alternatively, the example methods and apparatus disclosed herein may be used with the Online Campaign Ratings (OCR) systems developed by The Nielsen Company (US), LLC to monitor online activity. Example OCR systems employ a technique disclosed in Blumenau, U.S. Pat. No. 6,108,637, in which media distributed via a computer network (e.g., the Internet) is tagged with monitoring instructions (e.g., also known as beacon instructions). In particular, monitoring instructions are associated with the Hypertext Markup Language (HTML) of the media to be tracked. When a client (e.g., a media presentation device) requests the media, both the media and the beacon instructions are downloaded to the client. The beacon instructions are, thus, executed whenever the media is accessed, be it from a server or from a cache. The beacon instructions cause monitoring data reflecting information about the access to the media to be sent from the client that downloaded the media to a monitoring entity. Typically, the monitoring entity is an AME that did not provide the media to the client and who is a trusted third party for providing accurate usage statistics (e.g., The Nielsen Company, LLC). Because the beaconing instructions are associated with the media and executed by the client browser whenever the media is accessed, the monitoring information is provided to the AME irrespective of whether the client is a panelist of the AME.

In such examples involving OCR systems, the methods and apparatus disclosed herein enable an AME to calculate granular data of a region for activities (e.g., impressions of online activity) conducted by region members via a computer network system (e.g., the Internet) and monitored by an AME or other entity via a computer networked data collection system. Example methods and apparatus disclosed herein calculate granular data of a region (e.g., a scaling value or weight for region members satisfying a demographic constraint) based on aggregate behavioral data of the region (e.g., a total count of online impressions recorded by the computer networked data collection system), aggregate demographics data of the region (e.g., a count of region members satisfying the demographic constraint that have their online impression recorded for the demographic constraint by the computer networked data collection system), and granular data of a sub-population of panelists of the region (e.g., a scaling value or weight for panelists satisfying the demographic constraint).

Disclosed example methods for calculating granular data of a region for media audience measurement include determining, via a processor, aggregate behavioral data associated with a media audience measurement of a target region. The aggregate behavioral data includes a first count of target region members satisfying a behavioral constraint. The example methods also include determining, via the processor, aggregate demographics data of the target region. The aggregate demographics data includes a second count of the target region members satisfying a first demographic constraint and a third count of the target region members satisfying a second demographic constraint. The example methods also include determining, via the processor, granular data of a source region. The granular data includes a fourth count of source region members satisfying the behavioral constraint and the first demographic constraint and a fifth count of the source region members satisfying the behavioral constraint and the second demographic constraint. The example methods also include calculating, via the processor, granular data of the target region to measure a media audience of the target region by apportioning the aggregate demographics data and the aggregate behavioral data of the target region based on the granular data of the source region. The granular data of the target region includes a sixth count of the target region members satisfying the behavioral constraint and the first demographic constraint and a seventh count of the target region members satisfying the behavioral constraint and the second demographic constraint.

In some example methods, the first demographic constraint and the second demographic constraint are mutually exclusive.

In some example methods, calculating the granular data of the target region is further based on an importance matrix. The importance matrix includes a first weight associated with the first demographic constraint and a second weight associated with the second demographic constraint.

Some example methods include determining if there is a linear relationship between the aggregate demographics data and the aggregate behavioral data of the target region. Such example methods also include, in response to determining a linear relationship, calculating the granular data of the target region based on the linear relationship. Such example methods also include, in response to determining no linear relationship, calculating the granular data of the target region by performing non-linear optimization based on the granular data of the source region, the aggregate demographics data of the target region, and the aggregate behavioral data of the target region. In some such example methods, calculating the granular data of the target region by performing the non-linear optimization includes defining an optimization constraint based on the aggregate behavioral data and the aggregate demographics data of the target region. The non-linear optimization is limited by the optimization constraint. In some such example methods, calculating the granular data of the target region by performing the non-linear optimization further includes calculating an optimization parameter that indicates a variance based on the granular data of the source region and the granular data of the target region.

In some example methods, the target region is a non-panelist region and the source region is a panelist region, the non-panelist region and the panelist region being mutually exclusive. In some such example methods, determining the aggregate behavioral data of the target region includes determining tuning data of the target region, and determining the granular data of the source region includes determining exposure data of the source region.

In some example methods, the target region is a population and the source region is a sub-region of panelists of the population. In some such example methods, determining the aggregate behavioral data of the target region includes determining impressions data of the population, and determining the granular data of the source region includes determining impressions data associated with demographics data of the panelists.

In some example methods, determining the granular data of the target region based on the aggregate demographics data of the target region, the aggregate behavioral data of the target region, and the granular data of the source region reduces an amount of data collected by computer networked data collection systems to determine the granular data of the target region by calculating the granular data of the target region without collecting the granular data from the target region.

In some example methods, the processor includes at least a first processor of a first hardware computer system and a second processor of a second hardware computer system.

Disclosed example apparatus for calculating granular data of a region for media audience measurement include a target region determiner to determine aggregate behavioral data associated with media audience measurement of a target region. The aggregate behavioral data includes a first count of target region members satisfying a behavioral constraint. The target region determiner is to determine aggregate demographics data of the target region. The aggregate demographics data includes a second count of the target region members satisfying a first demographic constraint and a third count of the target region members satisfying a second demographic constraint. The example apparatus also include a source region determiner to determine granular data of a source region. The granular data includes a fourth count of source region members satisfying the behavioral constraint and the first demographic constraint and a fifth count of the source region members satisfying the behavioral constraint and the second demographic constraint. The example apparatus also include a target region calculator to calculate, via a processor, granular data of the target region to measure a media audience of the target region by apportioning the aggregate demographics data and the aggregate behavioral data of the target region based on the granular data of the source region. The granular data of the target region includes a sixth count of the target region members satisfying the behavioral constraint and the first demographic constraint and a seventh count of the target region members satisfying the behavioral constraint and the second demographic constraint.

In some example apparatus, the first demographic constraint and the second demographic constraint are mutually exclusive.

Some example apparatus include a constraint importance determiner to determine an importance matrix that includes a first weight associated with the first demographic constraint and a second weight associated with the second demographic constraint. The target region calculator is to calculate the granular data of the target region further based on an importance matrix.

In some example apparatus, the target region calculator includes a linear identifier to determine if there is a linear relationship between the aggregate demographics data and the aggregate behavioral data of the target region. In such example apparatus, the target region calculator also includes a linear calculator to calculate, in response to determining a linear relationship, the granular data of the target region based on the linear relationship. In such example apparatus, the target region calculator also includes a non-linear calculator to calculate, in response to determining no linear relationship, the granular data of the target region by performing non-linear optimization based on the granular data of the source region, the aggregate demographics data of the target region, and the aggregate behavioral data of the target region. In some such example apparatus, the non-linear calculator is to define an optimization constraint based on the aggregate behavioral data and the aggregate demographics data of the target region. The non-linear optimization is limited by the optimization constraint. In some such example apparatus, the non-linear calculator is to calculate an optimization parameter that indicates a variance based on the granular data of the source region and the granular data of the target region.

In some example apparatus, the target region is a non-panelist region and the source region is a panelist region, the non-panelist region and the panelist region being mutually exclusive. In some such example apparatus, to determine the aggregate behavioral data of the target region, the target region determiner is to determine tuning data of the target region and, to determine the granular data of the source region, the source region determiner is to determine exposure data of the source region.

In some example apparatus, the target region is a population and the source region is a sub-region of panelists of the population. In some such example apparatus, to determine the aggregate behavioral data of the target region, the target region determiner is to determine impressions data of the population and, to determine the granular data of the source region, the source region determiner is to determine impressions data associated with demographics data of the panelists.

In some example apparatus, the target region calculator is to calculate the granular data of the target region based on the aggregate demographics data of the target region, the aggregate behavioral data of the target region, and the granular data of the source region to reduce an amount of data collected by computer networked data collection systems to determine the granular data of the target region by calculating the granular data of the target region without collecting the granular data from the target region.

FIG. 1 is a block diagram of an example environment 100 that includes a target region 102, a source region 104, an AME 106, and a network 108. In the illustrated example, the target region 102 (e.g., a non-panelist region) includes households 110a, 110b (e.g., non-panelist households), and the source region 104 (e.g., a panelist region) includes households 112a, 112b (e.g., panelist households). As discussed in further detail below, the AME 106 of the example environment 100 calculates and/or estimates granular data of the target region 102 (e.g., to produce media ratings of the target region 102) based on aggregate demographics data and aggregate behavioral data of the target region 102 and granular data of the source region 104. Further, as discussed below, the network 108 of the illustrated example, among other things, communicatively couples the AME 106 to the households 110a, 110b, 112a, 112b of the respective first and source regions 102, 104.

The households 110a, 110b (e.g., non-panelist households) of the target region 102 (e.g., a non-panelist region) include respective members 114a, 114b, 114c (e.g., non-panelists), media presentation devices 116a, 116b, and STBs 118a, 118b. For example, the household 110a includes the members 114a, 114b, the media presentation device 116a, and the STB 118a, and the household 110b includes the member 114c, the media presentation device 116b, and the STB 118b.

In some examples, the households 110a, 110b are representative of many other households (e.g., other non-panelist households) that may be included in the example target region 102. Characteristics of the other households (e.g., a number of household members, demographics of the household members, a number of televisions, etc.) may be similar to and/or different from those of the representative households 110a, 110b. For example, other households include one member, two members, three members, four members, etc.

The STBs 118a, 118b of the illustrated example convert source signals into media that are presented via the respective media presentation devices 116a, 116b. In some examples, the STBs 118a, 118b implement a digital video recorder (DVR) and/or a digital versatile disc (DVD) player. In the illustrated example, the STBs 118a, 118b are in communication with the respective media presentation device 116a, 116b via wireless connections (e.g., Bluetooth, Wi-Fi, etc.) or via wired connections (e.g., Universal Serial Bus (USB), etc.) to transmit converted source signals from the STBs 118a, 118b to the respective media presentation devices 116a, 116b. In some examples, the STBs 118a, 118b are integrated into the respective media presentation devices 116a, 116b. In the illustrated example, the media presentation devices 116a, 116b are televisions. In alternative examples, the media presentation devices 116a, 116b are computers (e.g., desktop computers, laptop computers, etc.), speakers, stereos, portable devices (e.g., tablets, smartphones, etc.), gaming consoles (e.g., Xbox Ones®, Playstation® 4s, etc.), online media presentation devices (e.g., Google Chromecasts, Rokus® Streaming Sticks®, Apple TVs®, etc.) and/or any other type of media presentation devices.

As illustrated in FIG. 1, the tuning data 120a, 120b (e.g., behavioral data) and demographics data 122a, 122b are collected from the respective households 110a, 110b of the target region 102. The tuning data 120a, 120b collected by the example STBs 118a, 118b are associated with tuning events of the STBs 118a, 118b and/or the respective media presentation devices 116a, 116b (e.g., turning the STBs 118a, 118b on or off, changing channels presented via the media presentation devices 116a, 116b, increasing or lowering the volume, remaining on a channel for a duration of time, etc.) to monitor media (e.g., television programming, radio programming, movies, songs, advertisements, Internet-based programming such as websites and/or streaming media, etc.) presented by the respective media presentation devices 116a, 116b. For example, the tuning events of the tuning data 120a, 120b are identified by channel (e.g., Fox, ABC, NBC, ESPN, Nickelodeon, etc.) and time (e.g., a particular time such as 7:10 A.M. or 8:31 P.M., a predetermined time-period segment such as 7:00-7:15 A.M. or 8:00-8:30 P.M., etc.).

The tuning data 120a, 120b collected and/or recorded by the respective STBs 118a, 118b do not include exposure data (e.g., data indicating which members are exposed to particular media) or demographics data (e.g., data indicating a number of household members, age, gender, race, etc.) of the respective households 110a, 110b. For example, if the household member 114b is viewing "The Secret World of Alex Mack" via the media presentation device 116a, the tuning data 120a recorded by the STB 118a indicates that the STB 118a was tuned to Nickelodeon at 7:00 P.M. on Saturday, but does not identify that "The Secret World of Alex Mack" was exposed to the household member 114b or include demographics data of the household member 114b.

The example demographics data 122a, 122b include information regarding demographic constraints (e.g., demographic marginals of respective demographic dimensions, combinations of demographic marginals of combinations of respective demographic dimensions, etc.) of the target region 102, but do not include member-specific information of the members 114a, 114b, 114c or household-specific information of the households 110a, 110b of the target region 102. That is, the example demographics data 122a, 122b do not indicate which members 114a, 114b, 114c or households 110a, 110b of the target region 102 are associated with demographics of the collected demographics data 122a, 122b. In the illustrated example, the demographics data 122a, 122b associated with the households 110a, 110b of the target region 102 are collected via a survey-based census (e.g. a government-funded census, a privately-funded census).

As illustrated in FIG. 1, the households 112a, 112b (e.g., panelist households) of the source region 104 (e.g., a panelist region) include respective members 124a, 124b, 124c (e.g., panelists), media presentation devices 126a, 126b, and meters 128a, 128b (e.g., people meters). For example, the household 112a includes the members 124a, 124b, the media presentation device 126a, and the meter 128a, and the household 112b includes the member 124c, the media presentation device 126b, and the meter 128b.

In some examples, the households 112a, 112b are representative of many other households (e.g., other panelist households) that may be included in the example source region 104. Characteristics of the other households (e.g., a number of household members, demographics of the household members, a number of televisions, etc.) may be similar to and/or different from those of the representative households 112a, 112b. For example, other households include one member, two members, three members, four members, etc.

The meters 128a, 128b of the illustrated example are electronic devices that are positioned in media access areas (e.g., exposure areas such as living rooms of the households 112a, 112b) proximate to the respective media presentation devices 126a, 126b to monitor the media presented via the respective media presentation devices 126a, 126b and/or the media exposed to the members 124a, 124b, 124c. That is, the example meters 128a, 128b of the source region 104 collect exposure data 130a, 130b, 130c that identifies whether the corresponding members 124a, 124b, 124c were exposed to displayed media, while the STBs 118a, 118b of the target region 102 collect the tuning data 120a, 120b that identifies tuning events of the STBs 118a, 118b and/or the media presentation devices 116a, 116b but do not identify whether a member is exposed to the tuned event). Additionally or alternatively, the example panelists 124a, 124b, 124c may carry corresponding personal people meters (e.g., electronic devices designated to the members 124a, 124b, 124c) that monitor the media exposed to those corresponding members 124a, 124b, 124c.

In the illustrated example, the media presentation devices 126a, 126b are televisions. In alternative examples, the media presentation devices 126a, 126b are computers (e.g., desktop computers, laptop computers, etc.), speakers, stereos, portable devices (e.g., tablets, smartphones, etc.), gaming consoles (e.g., Xbox Ones®, Playstation® 4s, etc.), online media presentation devices (e.g., Google Chromecasts, Rokus® Streaming Sticks®, Apple TVs®, etc.) and/or any other type of media presentation devices.

As illustrated in FIG. 1, the example exposure data 130a, 130b, 130c (e.g., behavioral data) and demographics data 132a, 132b, 132c are collected from the respective households 112a, 112b of the source region 104. The example exposure data 130a, 130b, 130c are associated with media events exposed (e.g., exposure events) to the respective members 124a, 124b, 124c of the source region 104. The example exposure data 130a, 130b, 130c identify programs (e.g, Simpsons, Step by Step, Cheers, Sunday Night Baseball, Rugrats, etc.), channels (e.g., Fox, ABC, NBC, ESPN, Nickelodeon, etc.), and/or times (e.g., particular times such as 7:10 A.M. or 8:31 P.M., predetermined time-period segments such as 7:00-7:15 A.M. or 8:00-8:30 P.M., etc.) associated with the exposure events. The example exposure data 130a, 130b, 130c identify which member(s) (e.g., the example members 124a, 124b, 124c) are associated with the exposure events. Further, the example exposure data 130a, 130b, 130c may be associated with the corresponding demographics data (e.g., the demographics data 132a, 132b, 132c) of the identified members. As an example, if the member 124a is exposed to "American Gladiators," the exposure data 130a identifies the program (i.e., "American Gladiators"), the channel (USA Network), the time (e.g., 10:30 A.M. on Saturday) and/or the member (i.e., the member 124a) associated with the exposure event and is associated with the corresponding demographics data (e.g., the demographics data 130a) of the member.

In the illustrated example, the demographics data 132a includes person-specific information associated with the member 124a, the demographics data 132b includes person-specific information associated with the member 124b, and the demographics data 132c includes person-specific information associated with the member 124c. The demographics data 132a, 132b, 132c of the illustrated example identify which demographic constraints (e.g., demographic marginals of respective demographic dimensions, combinations of demographic marginals of combinations of respective demographic dimensions, etc.) are associated with the corresponding members 124a, 124b, 124c of the source region 104. For example, the demographics data 132a indicate that the member 124a satisfies the "white, middle-aged, male" demographic constraint, the demographics data 132b indicate that the member 124b satisfies the "black, middle-aged, female" demographic constraint, and the demographics data 132c indicate that the member 124c satisfies the "Latino, young, female" demographic constraint. The demographics data 132a, 132b, 132c may be provided by the members 124a, 124b, 124c via, for example, self-reporting, responding to surveys, providing consent for entities (e.g., AMEs) to obtain such information from database proprietors (e.g., Facebook, Twitter, Google, Yahoo!, MSN, Apple, Experian, etc.), etc. In some examples, the demographics data 132a, 132b, 132c is collected from the members 124a, 124b, 124c upon and/or after the members 124a, 124b, 124c are enlisted as panelists.

From time to time (periodically, aperiodically, randomly, when data capacity is reached, etc.), the STBs 118a, 118b communicate the collected tuning data 120a, 120b of the target region 102 and the meters 128a, 128b communicate the collected exposure data 130a, 130b, 130c of the source region 104 to the AME 106 via the network 108 (e.g., the Internet, a local area network, a wide area network, a cellular network, etc.) via wired and/or wireless connections (e.g., a cable/DSL/satellite modem, a cell tower, etc.).

The AME 106 of the illustrated example utilizes the collected demographics data 122a, 122b and the collected tuning data 120a, 120b of the target region 102 (e.g., a non-panelist region) and the collected demographics data 132a, 132b, 132c and the collected exposure data 130a, 130b, 130c of the source region 104 (e.g., a panelist region) to calculate granular data of the target region 102. In the illustrated example, the example AME 106 (e.g., The Nielsen Company (US), LLC®) calculates the granular data of the target region 102 to produce media ratings (e.g., a composition and/or size of a media audience) for the target region. The ratings produced by the example AME 106 may be used by advertisers and/or marketers to purchase advertising space and/or design advertising campaigns. Additionally or alternatively, the ratings produced by the example AME 106 are used by media producers and/or distributors to determine how to set prices for advertising space and/or make programming decisions.

As illustrated in FIG. 1, the AME 106 includes a target region demographics database 134, a target region behavioral database 136, a source region database 138, and a demographics estimator 140.

The target region demographics database 134 of the illustrated example stores the demographics data (e.g., the demographics data 122a, 122b) of the target region 102 in a non-person-specific, non-household-specific aggregate form. That is, the example target region demographics database 134 stores aggregate demographics data of the target region 102 that indicates count(s) and/or percentage(s) of members of the target region 102 satisfying demographic constraint(s) of interest (e.g., a "young female" demographic constraint, an "old female" demographic constraint, a "young male" demographic constraint, an "old male" demographic constraint, etc.) without identifying which members (e.g., the members 114a, 114b, 114c) and/or households (e.g., the households 110a, 110b) are associated with those demographic constraints.

The target region behavioral database 136 of the illustrated example stores the behavioral data (e.g., the tuning data 120a, 120b) of the target region 102 in a non-person-specific, non-household-specific aggregate form. That is, the example target region behavioral database 134 stores aggregate behavioral data of the target region 102 that indicates count(s) and/or percentage(s) of members of the target region 102 satisfying behavioral constraint(s) of interest (a "Fresh Prince of Bel-Air" behavioral constraint, a "Melrose Place" behavioral constraint, a "Murder, She Wrote" behavioral constraint, etc.) without identifying which members (e.g., the members 114a, 114b, 114c) and/or households (e.g., the households 110a, 110b) are associated with those behavioral constraints.

The source region database 138 of the illustrated example stores the demographics data (e.g., the demographics data 132a, 132b, 132c) and the behavioral data (e.g., the exposure data 130a, 130b, 130c) of the source region 104 in granular form. That is, the example source region database 138 stores granular data of the source region 104 that indicates count(s) and/or percentage(s) of members of the target region 104 satisfying behavioral constraint(s) of interest (a "Fresh Prince of Bel-Air" behavioral constraint, a "Melrose Place" behavioral constraint, a "Murder, She Wrote" behavioral constraint, etc.) that also satisfy demographic constraint(s) of interest (e.g., a "young female" demographic constraint, an "old female" demographic constraint, a "young male" demographic constraint, an "old male" demographic constraint, etc.).

Based on the aggregate demographics data of the target region demographics database 134, the aggregate behavioral data of the target region behavioral database 136, and the granular data of source region database 138, the demographics estimator 140 of the illustrated example calculates granular data of the target region 102. For example, based on aggregate data of the target region 102 and granular data of the source region 104 (e.g., a panelist region), the demographics estimator 140 calculates granular data of the target region 102 (e.g., a non-panelist region) to measure a size and/or composition of media audiences in the target region 102.

In operation, non-person-specific demographics data (e.g., the demographics data 122a, 122b) and non-personspecific behavioral data (e.g., the tuning data 120a, 120b) are collected from households (e.g., the households 110a, 110b) of a non-panelist region (e.g., the target region 102). Further, person-specific demographics data (e.g., the demographics data 132a, 132b, 132c) and person-specific behavioral data (e.g., the exposure data 130a, 130b, 130c) are collected from households (e.g., the households 112a, 112b) of a panelist region (e.g., the source region 104). The collected demographics and behavioral data are sent to the AME 106 via the network 108. The target region demographics database 134 of the AME 106 stores the demographics data of the non-panelist region in aggregate form, the target region behavioral database 136 stores the behavioral data of the non-panelist region in aggregate form, and the source region database 138 stores the demographics and behavioral data of the panelist region 104 in granular form. Based on the aggregate data of the non-panelist region and the granular data of the panelist region, the demographics estimator 140 calculates granular data of the non-panelist region that may be used to measure media audiences of the non-panelist region.

Calculating granular data of a target region based on aggregate data of the target region and granular data of another region (e.g., a source region) provides a solution to the technological problem of how to reduce an amount of data that is collected from the target region by computer networked data collection systems to determine the granular data of the target region. Further, by calculating the granular data of the target region based on, in part, the aggregate data of the target region, the disclosed example methods and apparatus provide a solution to the technological problem of utilizing non-person-specific aggregate tuning data (e.g., tuning data not associated with demographics data) collected from the target region by computer networked data collection systems to calculate the granular data of the target region.

Figure 2:
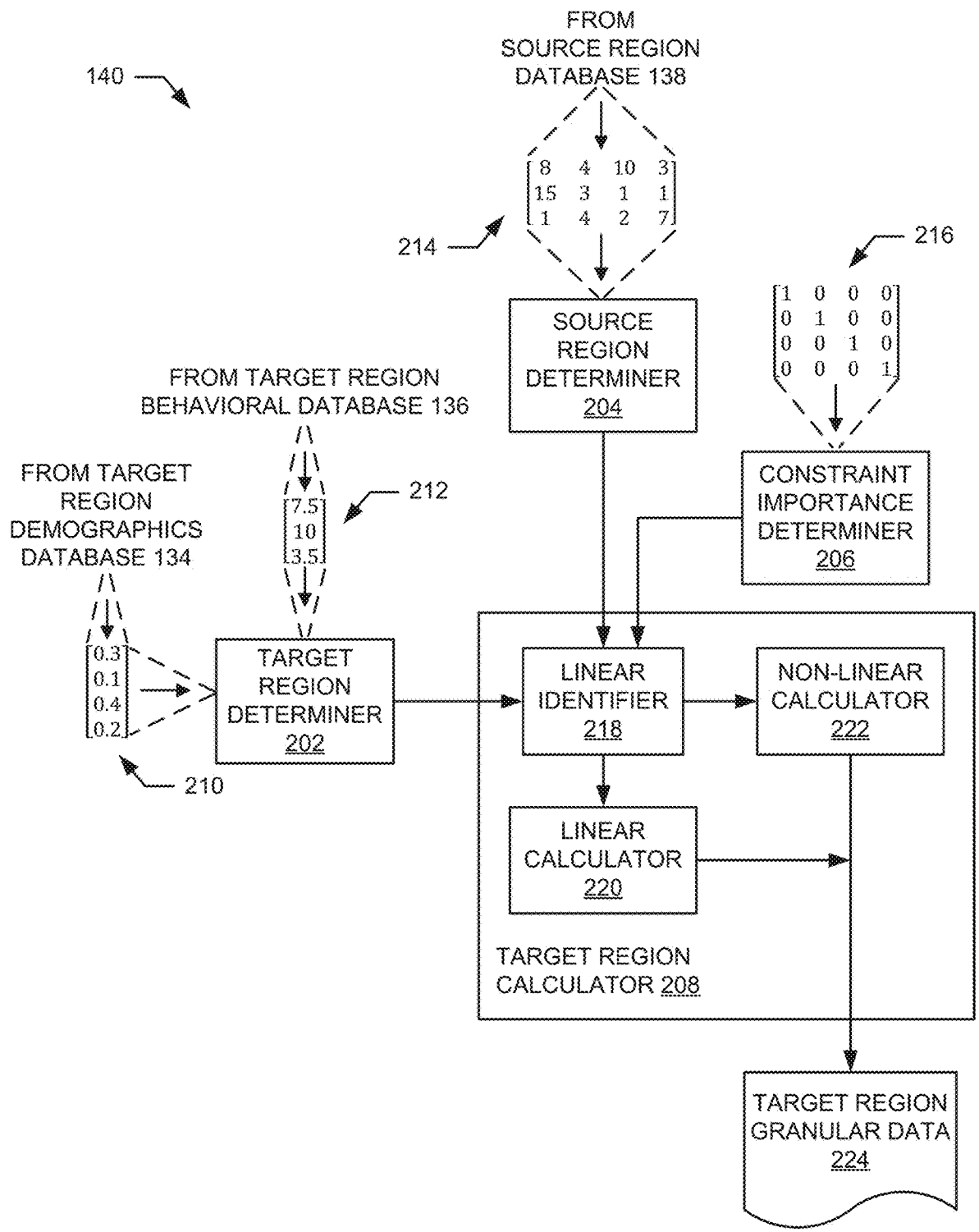
FIG. 2 is a block diagram of an example implementation of the demographics estimator of FIG. 1 that is to calculate the granular data of the target region of FIG. 1.

FIG. 2 is a block diagram of an example implementation of the example demographics estimator 140 of FIG. 1 that is to calculate the granular data of the example target region 102 of FIG. 1. As illustrated in FIG. 2, the example demographics estimator 140 includes an example target region determiner 202, an example source region determiner 204, an example constraint importance determiner 206, and an example target region calculator 208.

The target region determiner 202 of the illustrated example determines aggregate demographics data 210 of the example target region 102. For example, the target region determiner 202 collects the aggregate demographics data 210 that is based on the example demographics data 122a, 122b, of the example households 110a, 110b (e.g., non-panelist households) of the target region 102 (e.g., a non-panelist region) from the example target region demographics database 134 of FIG. 1. For example, the example aggregate demographics data 210 collected by the target region determiner 202 includes non-person-specific and non-household-specific data collected via a survey-based census (e.g. a government-funded census, a privately-funded census). In some examples, the target region determiner 202 obtains the aggregate demographics data 210 from the target region demographics database 134 via a network (e.g., the Internet, a local area network, a wide area network, a cellular network, etc.) and wired and/or wireless connections (e.g., a cable/DSL/satellite modem, a cell tower, etc.).

As illustrated in FIG. 2, the example target region determiner 202 collects the example aggregate demographics data 210 in vector form. Elements of the example aggregate demographics data 210 correspond to demographic constraints of interest. For example, an element of a first row of the example aggregate demographics data 210 corresponds with a "young female" demographic constraint, an element of a second row corresponds with an "old female" demographic constraint, an element of a third row corresponds with a "young male" demographic constraint, and an element of a fourth row corresponds with an "old male" demographic constraint. Additionally or alternatively, the example aggregate demographics data 210 may include elements that correspond to demographic constraints associated with other demographic marginals (e.g., income, race, nationality, geographic location, education level, religion, etc.), demographic joint-marginals (e.g., a gender/race/income demographic joint-marginal), demographic joints (e.g., a gender/race/income/education-level demographic joint), and/or any combination thereof.

The elements of the example aggregate demographics data 210 represent quantities (e.g., counts, percentages) of the target region 102 that match, belong to and/or satisfy the corresponding demographics of interest. As illustrated in FIG. 2, the elements of the example aggregate demographics data 210 are normalized to a value of 1.0 such that the sum of the elements of the aggregate demographics data 210 equals a value of 1.0. For example, the element of the first row of the example aggregate demographics data 210 includes a value of '0.3' that indicates 30% of members of the target region 102 are young females, the element of the second row includes a value of '0.1' that indicates 10% of members of the target region 102 are old females, the element of the third row includes a value of '0.4' that indicates 40% of members of the target region 102 are young males, and the element of the fourth row includes a value of '0.2' that indicates 20% of members of the target region 102 are old males.

Further, the example target region determiner 202 determines aggregate tuning data 212 (e.g., aggregate behavioral data) of the example target region 102. For example, the target region determiner 202 collects the aggregate tuning data 212 that is based on the example non-person-specific tuning data 120a, 120b of the example households 110a, 110b (e.g., non-panelist households) of the first region 102 (e.g., a non-panelist region) from the example target region behavioral database 136 of FIG. 1. In some examples, the target region determiner 202 obtains the aggregate tuning data 212 from the target region behavioral database 136 via a network (e.g., the Internet, a local area network, a wide area network, a cellular network, etc.) and wired and/or wireless connections (e.g., a cable/DSL/satellite modem, a cell tower, etc.).

As illustrated in FIG. 2, the example target region determiner 202 collects the example aggregate tuning data 212 in vector form. Elements of the example aggregate tuning data 212 correspond to behavioral constraints (e.g., tuning events) of interest. For example, an element of a first row of the example aggregate tuning data 212 corresponds with a "Fresh Prince of Bel-Air" behavioral constraint, an element of a second row corresponds with a "Melrose Place" behavioral constraint, and an element of a third row corresponds with a "Murder, She Wrote" behavioral constraint. Additionally or alternatively, the example aggregate demographics data 210 may include elements that correspond to demographic constraints associated with other behavioral constraints (e.g., tuning durations, channels tuned, tuning times, etc.). Alternatively, the behavioral constraints of interest correspond to elements of columns of a vector form of the aggregate tuning data 212.

The elements of the example aggregate tuning data 212 represent quantities (e.g., counts, percentages, ratings points, ratings shares, etc.) of households of the target region 102 (e.g., the households 110a, 110b) that match, belong to and/or satisfy the corresponding behavioral characteristics (e.g., tuning events) of interest. For example, a value of the element of the first row of the example aggregate tuning data 212 indicates that 7.5% of the households of the target region 102 (e.g., the example households 110a, 110b of FIG. 1) tuned to a first program (e.g., "Fresh Prince of Bel-Air"), a value of the element of the second row indicates that 10% of the households were tuned to a second program (e.g., "Melrose Place"), and a value of the element of the third row indicates that 3.5% of the households were tuned to a third program (e.g., "Murder, She Wrote").

The source region determiner 204 of the illustrated example determiners granular data 214 of the example source region 104 of FIG. 1. For example, the source region determiner 204 collects the granular data 214 that is based on exposure data (e.g., the example exposure data 130a, 130b, 130c of FIG. 1) and demographics data (e.g., the example demographics data 132a, 132b, 132c of FIG. 1) of panelist households (e.g., the example households 112a, 112b of FIG. 1) of the source region 104 (e.g., a panelist region) from the example source region database 138 of FIG. 1. In some examples, the source region determiner 204 obtains the granular data 214 from the source region database 138 via a network (e.g., the Internet, a local area network, a wide area network, a cellular network, etc.) and wired and/or wireless connections (e.g., a cable/DSL/satellite modem, a cell tower, etc.).

As illustrated in FIG. 2, the example source region determiner 204 collects the example granular data 214 in matrix form. In the illustrated example, rows of the granular data 214 collected by the source region determiner 204 correspond to behavioral constraints of interest, and columns of the granular data 214 correspond to demographic constraints of interest. The behavioral constraints corresponding to the rows of the example granular data 214 are the same behavioral constraints of the example aggregate tuning data 212. For example, a first row of the granular data 214 collected by the example source region determiner 204 corresponds with a "Fresh Prince of Bel-Air" behavioral constraint, a second row corresponds with a "Melrose Place" behavioral constraint, and an a third row corresponds with a "Murder, She Wrote" behavioral constraint. Further, the demographic constraints corresponding to the columns of the example granular data 214 are the same demographic constraints of the example aggregate demographics data 210. For example, a first column of the granular data 214 collected by the example source region determiner 204 corresponds with a "young female" demographic constraint, a second column corresponds with an "old female" demographic constraint, a third column corresponds with a "young male" demographic constraint, and a fourth column corresponds with an "old male" demographic constraint.

Elements of the granular data 214 collected by the source region determiner 204 represent values indicative of quantities (e.g., counts, percentages, ratings points, ratings shares, etc.) of members of the source region 104 matching, satisfying, and/or belonging to the corresponding behavioral constraint that also match, satisfy, and/or to the corresponding demographic constraint. For example, a value in an element corresponding to the first row and the first column of the example granular data 214 indicates that 8% of young females of the source region 104 were exposed to "The Fresh Prince of Bel-Air." Similarly, a value in an element corresponding to the first row and the second column indicates that 4% of old females were exposed to "The Fresh Prince of Bel-Air," a value in an element corresponding to the first row and the third column indicates that 10% of young males were exposed to "The Fresh Prince of Bel-Air," and a value in an element corresponding to the first row and the fourth column indicates that 3% of old males were exposed to "The Fresh Prince of Bel-Air." Further, as illustrated in the example granular data 214 of FIG. 2, a value in an element corresponding to the second row and the first column indicates that 15% of young females were exposed to "Melrose Place," and a value in an element corresponding to the third row and the first column indicates that 1% of young females were exposed to "Murder, She Wrote."

The constraint importance determiner 206 of the illustrated example determines an importance matrix 216. The example importance matrix 216 includes values that represent weights for the behavioral constraints of interest (e.g., the behavioral constraints of the example aggregate tuning data 212 and of the granular data 214). In the illustrated example, a value in a first column of the importance matrix 216 represents a weight corresponding to the demographic constraint in the first column of the granular data 214 (e.g., the "young female" constraint), a value in a second column of the importance matrix 216 represents a weight corresponding to the demographic constraint in the second column of the granular data 214 (e.g., the "old female" constraint), a value in a third column of the importance matrix 216 represents a weight corresponding to the demographic constraint in the third column of the granular data 214 (e.g., the "young male" constraint), and a value in a fourth column of the importance matrix 216 represents a weight corresponding to the demographic constraint in the fourth column of the granular data 214 (e.g., the "old male" constraint). For example, if the example AME 106 or another entity determines that the "young female" demographic constraint is twice as valuable as the "old male" demographic constraint, the importance matrix 216 includes a value of '2' in the first column and includes a value of '1' in the third column. In the illustrated example, the importance matrix 216 of FIG. 2 is an identity matrix that indicates the behavioral constraints of interest are weighted equally (e.g., are of equal importance to the AME 106 or other entity).

In the illustrated example, the target region calculator 208 includes an example linear identifier 218, an example linear calculator 220, and an example non-linear calculator 222. The example target region calculator 208 calculates target region granular data 224 that includes estimates of quantities (e.g., counts, percentages, ratings points, ratings shares, etc.) of members of the target region 102 matching, satisfying, and/or belonging to behavioral constraints of interest that also match, satisfy, and/or demographic constraints of interest.

To calculate the example granular data 224 of the target region 102, the linear identifier 218 of the example target region calculator 208 determines whether there are behavioral constraints of the aggregate tuning data 212 for which there is a linear relationship between the aggregate demographics data 210 and the aggregate tuning data 212. For example, the linear identifier 218 determines whether there is a linear relationship between the aggregate demographics data 210 and the aggregate tuning data 212 for the example "Fresh Prince of Bel-Air" constraint, the example "Melrose Place" constraint, and the example "Murder, She Wrote"

constraint. The example linear identifier 218 determines whether linear relationships exist based on Equation 1 provided below.

$$R_{gran}w_{dem}=R_{behav} \qquad \text{Equation 1}$$

In Equation 1 provided above, $R_{gran}$ represents the granular data 224 of the target region 102 to be calculated by the example target region calculator 208, $w_{dem}$ represents the aggregate demographics data 210 determined by the example target region determiner 202, and $R_{behav}$ represents the aggregate tuning data 212 determined by the example target region determiner 202.

For the behavioral constraints of the example aggregate tuning data 212 for which the example linear identifier 218 identifies a linear relationship between the aggregate demographics data 210 and the aggregate tuning data 212, the example linear calculator 220 of the example target region calculator 208 calculates the granular data 224 for those behavioral constraints based on the linear relationship. To calculate the granular data 224 for a behavioral constraint of interest, the example linear calculator 220 apportions the value of the aggregate tuning data 212 associated with that behavioral constraint among the demographic constraints of the aggregate demographics data 210 (e.g., the "young female" constraint, the "old female" constraint, the "young male" constraint, the "old male" constraint). As a result, the linear calculator 220 calculates values (e.g., values of granular data 224) that correspond to the behavioral constraint and the respective demographic constraints. For example, the linear calculator 220 calculates the example granular data 224 for the behavioral constraints by applying linear algebra to the above-provided Equation 1. By calculating the granular data 224 for the behavioral constraints utilizing linear algebra, the linear calculator 220 reduces the processing resources utilized by target region calculator 208 to calculate the granular data 224 for those behavioral constraints.

For the behavioral constraints of the example aggregate tuning data 212 for which the linear identifier 218 does not identify a linear relationship (i.e., identifies a non-linear relationship) between the aggregate demographics data 210 and the aggregate tuning data 212, the non-linear calculator 222 of the example target region calculator 208 calculates the granular data 224 for those characteristics based on non-linear optimization. The example non-linear calculator 222 calculates the granular data 224 for those behavioral constraints having non-linear relationships by minimizing Equation 2 provided below.

$$\|(R_{gran}-R_{source})M\|_2 \qquad \text{Equation 2}$$

In Equation 2 provided above, $R_{gran}$ represents the granular data 224 of the target region 102 to be calculated by the example target region calculator 208, $R_{source}$ represents the granular data 214 determined by the example source region determiner 204, and M represents the importance matrix 216 determined by the example constraint importance determiner 206.

The example non-linear calculator 222 performs non-linear optimization by minimizing the above-provided Equation 2 subject to a constraint of the above-provided Equation 1 and subject to a lower and upper bounds constraint that is represented by $0 \le R_{source} \le 100$. Thus, the example non-linear calculator 222 performs non-linear optimization for the behavioral constraint having a non-linear relationship based on the example aggregate demographics data 210 (e.g., $w_{dem}$ of the identified constraint represented by Equation 1), the example tuning data 212 (e.g., $R_{behav}$ of the identified constraint represented by Equation 1), the example granular data 214 of the source region 104 (e.g., $R_{source}$ of the identified lower and upper bounds constraint and of the equation to be minimized represented by Equation 2), and the example importance matrix 216 (M of the equation to be minimized represented by Equation 2).

By performing non-linear optimization on the above-provided Equation 2, the example non-linear calculator 222 apportions the value of the aggregate tuning data 212 associated with that behavioral constraint among the demographic constraints associated with the aggregate demographics data 210. As a result, the non-linear calculator 222 calculates values (e.g., values of the granular data 224) that correspond to the identified behavioral constraint and the respective demographic constraints. For example, to determine values for the "Fresh Prince of Bel-Air" behavioral constraint, the non-linear calculator 222 apportions the value of the example aggregate tuning data 212 corresponding to that constraint (e.g., a value of '7.5') among the demographic constraints associated with the aggregate demographics data (e.g., the "young female" constraint, the "old female" constraint, the "young male" constraint, and the "old male" constraint). The values apportioned by the example non-linear calculator 222 represent a portion (e.g., a count, a percentage) of members of the target region 102 satisfying the corresponding demographic constraint that also satisfy the corresponding behavioral constraint. For example, the non-linear calculator 222 calculates a percentage of young females of the target region 102 that were exposed to "The Fresh Prince of Bel-Air." For the other behavioral constraints identified by the example linear identifier 218 as having a non-linear relationship, the example non-linear calculator 222 apportions the aggregate tuning data 212 in a similar manner.

Upon the non-linear calculator 222 calculating the granular data 224 for the behavioral constraints the linear identifier 218 identifies as having a non-linear relationship, the example non-linear calculator 222 calculates an optimization parameter for the granular data 224 of the target region 102. The optimization parameter calculated by the example non-linear calculator 222 represents a minimum value that was produced by the non-linear calculator 222 performing the non-linear optimization on the above-provided Equation 2. For example, the optimization parameter calculated by the non-linear calculator 222 indicates a variance based on the granular data 214 of the source region 104 and the granular data 224 of the target region 102.

To calculate the optimization parameter, the example non-linear calculator 222 compares values of the granular data 224 of the target region 102 to corresponding values of the granular data 214 of the source region 104. The example non-linear calculator 222 calculates variances for the corresponding elements of the granular data 224 and the granular data 214 and sums the calculated variances together to calculate the optimization parameter. For example, the non-linear calculator calculates variances for the values of the first row and the first column (e.g., associated with the "Fresh Prince of Bel-Air" behavioral constraint and the "young female" demographic constraint) of the granular data 224 and the granular data 214, the values of the first row and the second column (e.g., associated with the "Fresh Prince of Bel-Air" behavioral constraint and the "old female" demographic constraint) of the granular data 224 and the granular data 214, the values of the first row and the third column (e.g., associated with the "Fresh Prince of Bel-Air" behavioral constraint and the "young male" demographic constraint) of the granular data 224 and the granular data 214, etc. Upon calculating the variances for the elements of the granular data 224 and the granular data 214, the example non-linear calculator 222 sums together the variances of the elements of the granular data 224 and the granular data 214 to calculate the optimization parameter.

After the example linear calculator 220 and/or the example non-linear calculator 222 calculate the granular data 224 for the target region 102, the example target region calculator 208 integrates the granular data 224 calculated by the linear calculator 220 and the granular data 224 calculated by the non-linear calculator 222. For example, the example target region calculator 208 produces the granular data 224 as shown below in Table 1.

TABLE 1

|  | Young Female | Old Female | Young Male | Old Male |
| --- | --- | --- | --- | --- |
| Fresh Prince of Bel-Air | 8.1001 | 4.0335 | 10.1331 | 3.0668 |
| Melrose Place | 19.6000 | 4.5333 | 7.1334 | 4.0666 |
| Murder, She Wrote | 1.5999 | 4.2003 | 2.7999 | 7.4002 |

The values of the example granular data 224 of the target region 102 provided above in Table 1 represent quantities (e.g., counts, percentages, etc.) of members of the target region 102 satisfying corresponding demographic constraints of interest that also satisfy corresponding behavioral constraints of interest. For example, as provided above in Table 1, the example granular data 224 calculated by the example target region calculator 208 indicate that 19.6000% of young females of the example target region 102 were exposed to "Melrose Place."

The example demographics estimator 140 of FIGS. 1 and/or 2 enables the example AME 106 or other entity to calculate the granular data 224 of the example target region 102 based on the example aggregate demographics data 210 and the example aggregate tuning data 212 of the target region 102, thereby reducing an amount of data collected from the target region 102 by computer networked data collection systems. For example, the demographics estimator 140 enables the example AME 106 or other entity to calculate the granular data 224 of the example target region 102 based on non-person-specific tuning data collected from STBs (e.g., the example STBs 118a, 118b of FIG. 1) of the target region 102 and non-person-specific and non-household-specific census data without having to collect person-specific demographics and behavioral data from panelists of the target region.

While an example manner of implementing the demographics estimator 140 of FIG. 1 is illustrated in FIG. 2, one or more of the elements, processes and/or devices illustrated in FIG. 2 may be combined, divided, re-arranged, omitted, eliminated and/or implemented in any other way. Further, the example target region determiner 202, the example source region determiner 204, the example constraint importance determiner 206, the example target region calculator 208 and/or, more generally, the example demographics estimator 140 of FIG. 2 may be implemented by hardware, software, firmware and/or any combination of hardware, software and/or firmware. Thus, for example, any of the example target region determiner 202, the example source region determiner 204, the example constraint importance determiner 206, the example target region calculator 208 and/or, more generally, the example demographics estimator 140 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example target region determiner 202, the example source region determiner 204, the example constraint importance determiner 206, the example target region calculator 208, and/or the example demographics estimator 140 is/are hereby expressly defined to include a tangible computer readable storage device or storage disk such as a memory, a digital versatile disk (DVD), a compact disk (CD), a Blu-ray disk, etc. storing the software and/or firmware. Further still, the example demographics estimator 140 of FIG. 1 may include one or more elements, processes and/or devices in addition to, or instead of, those illustrated in FIG. 2, and/or may include more than one of any or all of the illustrated elements, processes and devices.

Figure 3:
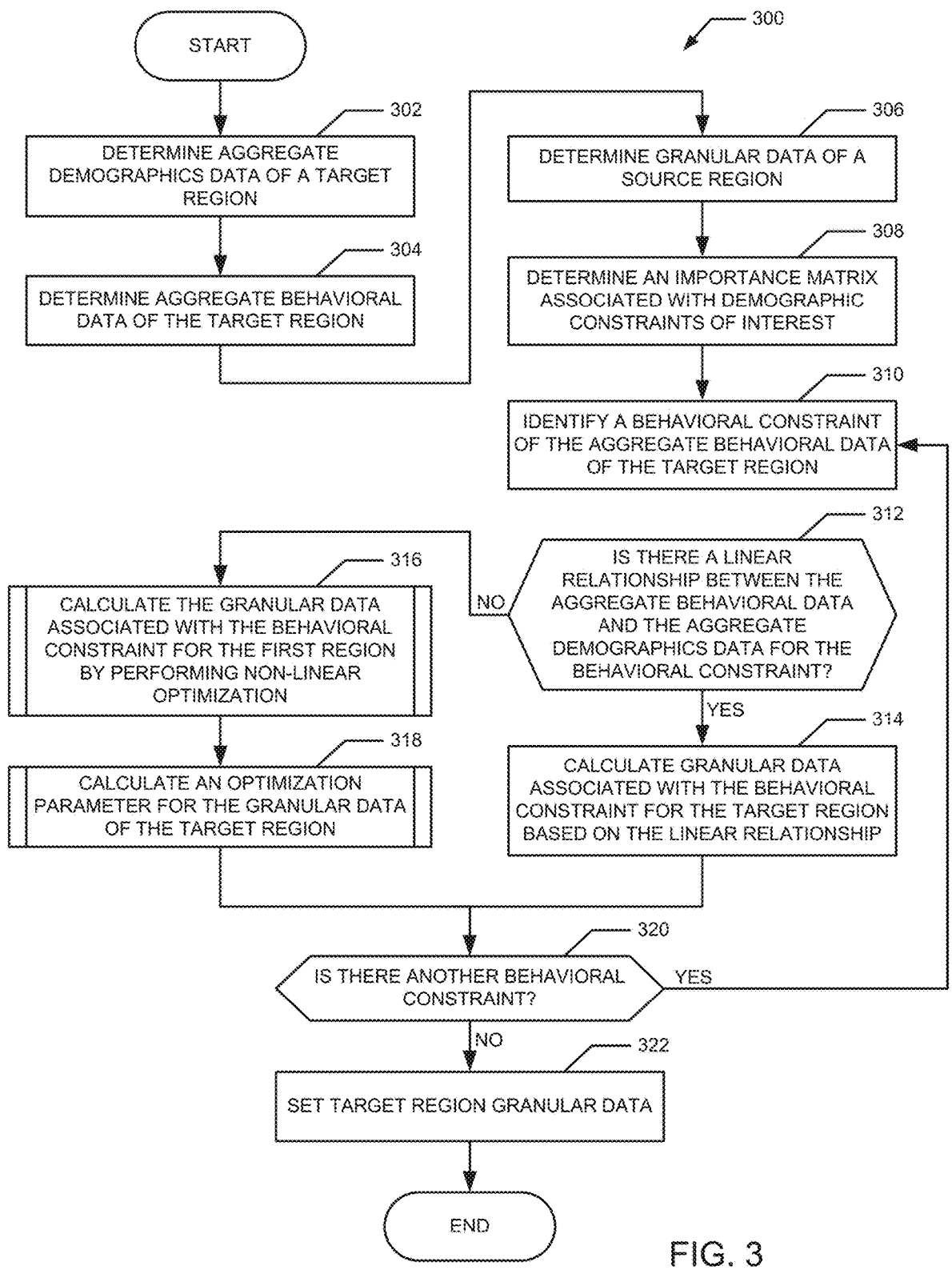
FIG. 3 is a flow diagram representative of example machine readable instructions that may be executed to implement the example demographics estimator of FIGS. 1 and/or 2 to calculate the granular data of the target region of FIG. 1.
Figure 4:
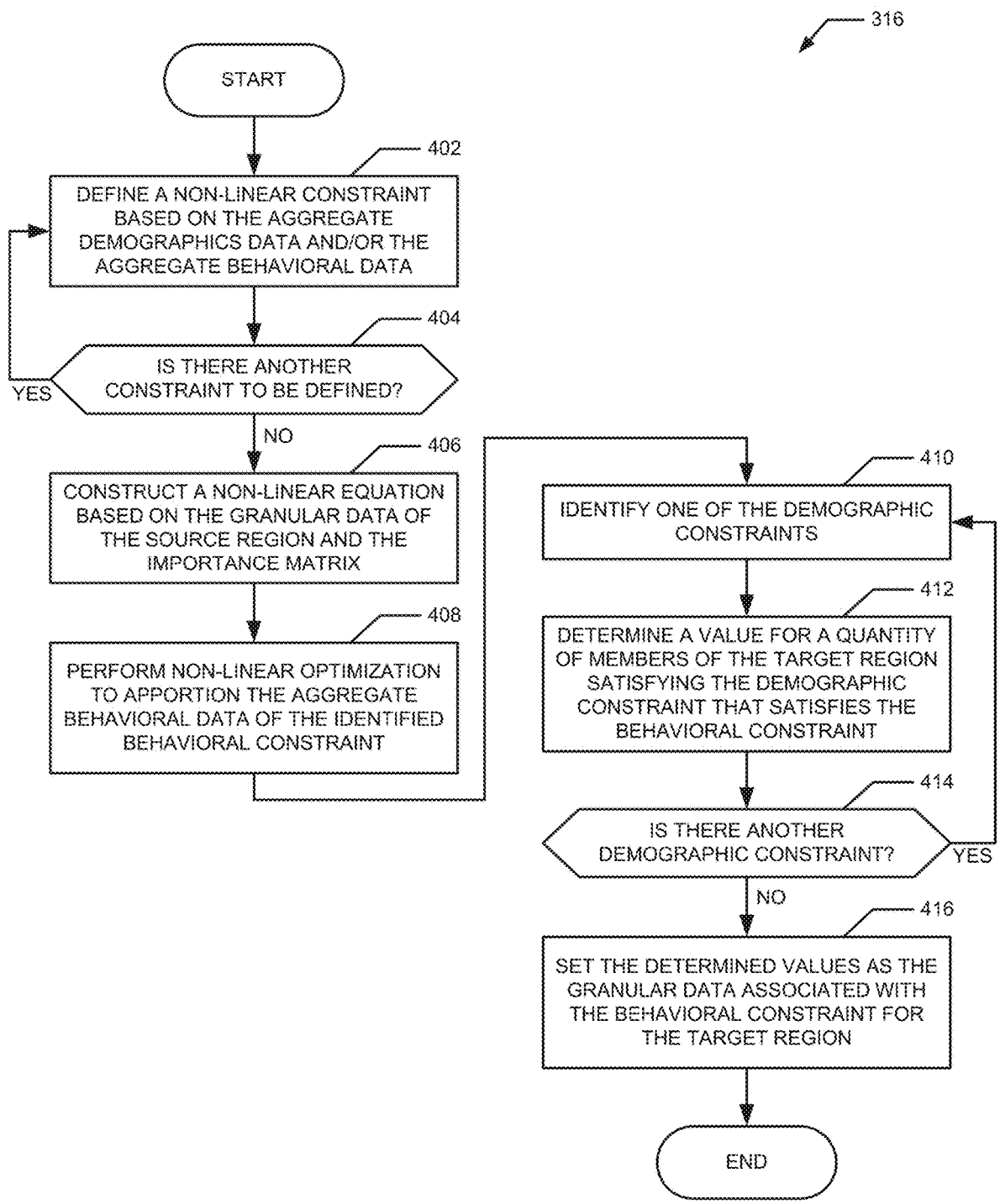
FIG. 4 is a flow diagram representative of example machine readable instructions that may be executed to implement the example non-linear calculator of FIG. 2 to calculate the granular data of the target region of FIG. 1.
Figure 5:
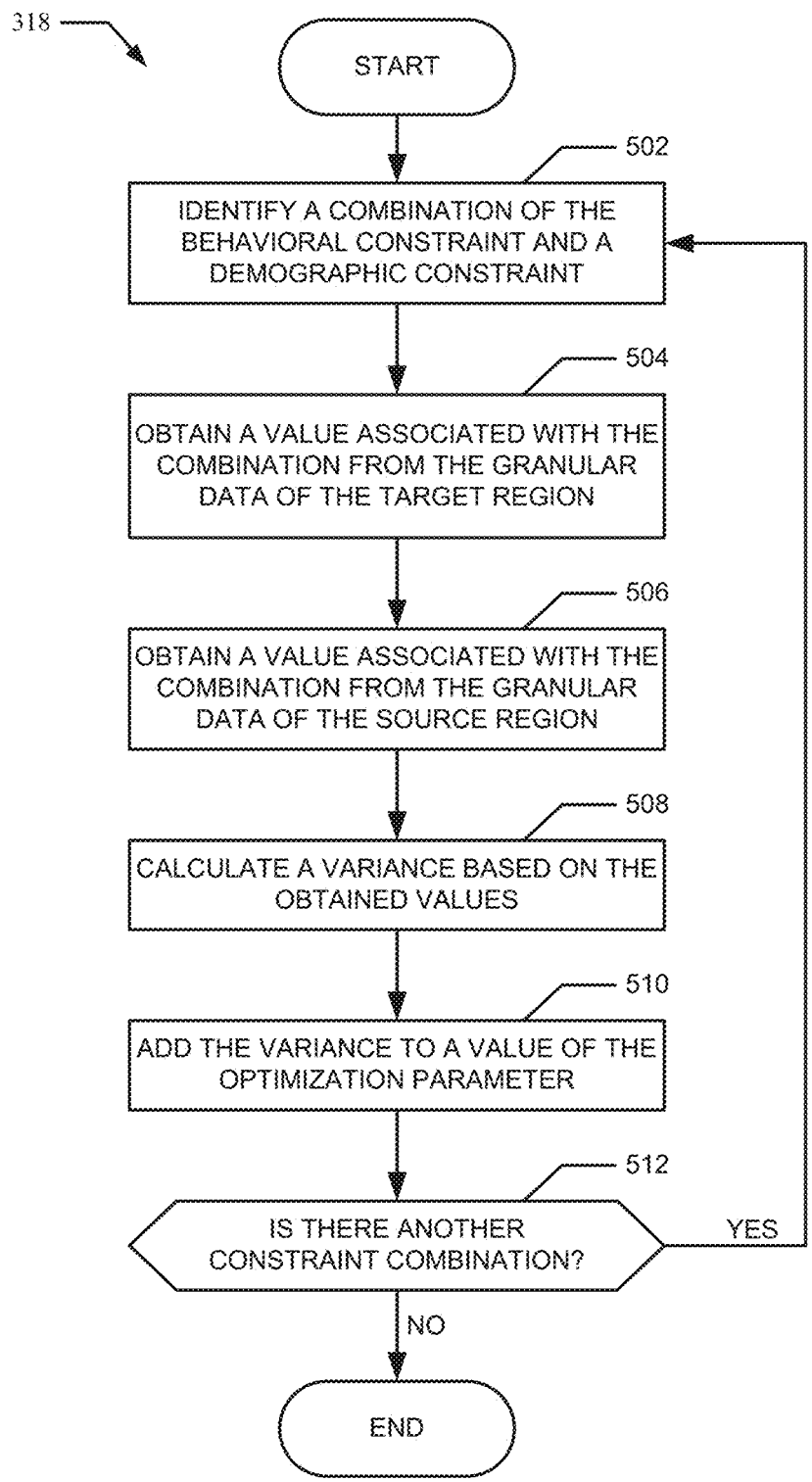
FIG. 5 is a flow diagram representative of example machine readable instructions that may be executed to implement the example non-linear calculator of FIG. 2 to calculate an optimization parameter associated with the calculated granular data of the target region of FIG. 1.

A flowchart representative of example machine readable instructions for implementing the demographics estimator 140 of FIG. 1 is shown in FIG. 3. Flowcharts representative of example machine readable instructions for implementing the target region calculator 208 of FIG. 2 are shown in FIGS. 4 and 5. In this example, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 3, 4, and/or 5 many other methods of implementing the example demographics estimator 140 may alternatively be used. For example, the order of execution of the blocks may be changed, and/or some of the blocks described may be changed, eliminated, or combined.

As mentioned above, the example processes of FIGS. 3, 4, and/or 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3, 4, and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flow diagram representative of example machine readable instructions 300 that may be executed to implement the example demographics estimator 140 of FIGS. 1 and/or 2 to calculate the granular data 224 of the target region 102 of FIG. 1. Initially, at block 302, the example target region determiner 202 determines the example aggregate demographics data 210 of the example target region 102. For example, the aggregate demographics data 210 determined by the target region determiner 202 is in vector form in which elements represent values indicative of quantities (e.g., counts, percentages) of the members (e.g., the example members 114a, 114b, 114c of FIG. 1) of the target region 102 that are associated with demographic constraints of interest (e.g., a "young female" constraint, an "old female" constraint, a "young male" constraint, an "old male" constraint). For example, the aggregate demographics data 210 determines the example aggregate demographics data 210 such that elements are normalized to a value of 1.0 such that the sum of the elements of the aggregate demographics data 210 equals a value of 1.0.

At block 304, the example target region determiner 202 determines the aggregate tuning data 212 (e.g., aggregate behavioral data) of the target region 102. The example target region determiner 202 determines the example aggregate tuning data 212 in vector form in which elements represent values indicative of quantities (e.g., counts, percentages) of the households (e.g., the example households 110a, 110b of FIG. 1) of the target region 102 that are associated with behavioral constraints (e.g., tuning events) of interest (e.g., a "Fresh Prince of Bel-Air" constraint, a "Melrose Place" constraint, a "Murder, She Wrote" constraint).

At block 306, the example source region determiner 204 determines the example granular data 214 of the example source region 104. The example source region determiner 204 determines the example granular data 214 in matrix form such that rows correspond to behavioral constraints of interest, columns correspond to demographic constraints of interest, and elements represent values indicative of quantities (e.g., counts, percentages, ratings points, ratings shares, etc.) of members of the source region 104 satisfying the corresponding behavioral constraints that also satisfy the corresponding demographic constraints. For example, the granular data 214 determined by the source region determiner 204 includes data for the same demographic constraints as the example aggregate demographics data 210 and the same behavioral constraints as the example aggregate tuning data 212.

At block 308, the example constraint importance determiner 206 determines the importance matrix 216. The example constraint importance determiner 206 determines the importance matrix 216 to obtain weights of importance for the demographic constraints of the aggregate demographics data 210 of the target region 102 and the granular data 214 of the source region 104. For example, the constraint importance determiner 206 determines that the example importance matrix 216 is an identity matrix such that the demographic constraints of interest are weighted equally (e.g., are of equal importance).

At block 310, the example target region calculator 208 identifies a behavioral constraint (e.g., a constraint associated with a tuning event) of the aggregate tuning data 212 and the granular data 214. For example, the target region calculator 208 identifies a behavioral constraint (e.g., the "Fresh Prince of Bel-Air" constraint) associated with the first row of the aggregate tuning data 212 and the first row of the granular data 214.

At block 312, the example linear identifier 218 of the example target region calculator 220 determines whether there is a linear relationship between the aggregate tuning data 212 and the aggregate demographics data 210 for the behavioral constraint identified at block 310. For example, the linear identifier 218 determines whether there is a linear relationship between the aggregate tuning data 212 and the aggregate demographics data 210 for the "Fresh Prince of Bel-Air" demographic constraint. The example linear identifier 218 determines whether there is a linear relationship based on Equation 3 provided below.

$$R_{gran} w_{dem} = R_{behav} \quad \text{Equation 3}$$

In Equation 3 provided above, $R_{gran}$ represents the granular data 224 of the target region 102, $w_{dem}$ represents the aggregate demographics data 210, and $R_{behav}$ represents the aggregate tuning data 212.

If the example linear identifier 218 determines that there is a linear relationship between the aggregate tuning data 212 and the aggregate demographics data 210 for the identified behavioral constraint, the example linear calculator 220 calculates, based on the linear relationship, the granular data 224 of the target region 102 for the identified behavioral constraint (block 314). The example linear calculator 220 calculates the granular data 224 for the identified behavioral constraint by applying linear algebra to the above-provided Equation 3. For example, to calculate the granular data 224 for the identified behavioral constraint, the linear calculator 220 apportions the value of the aggregate tuning data 212 associated with that behavioral constraint among the demographic constraints (e.g., the "young female" constraint, the "old female" constraint, the "young male" constraint, the "old male" constraint) associated with the aggregate demographics data 210 and the granular data 214.

If the example linear identifier 218 determines that there is a not a linear relationship (i.e., identifies a non-linear relationship) between the aggregate tuning data 212 and the aggregate demographics data 210 for the identified behavioral constraint, the example non-linear calculator 222 of the target region calculator 208 calculates the granular data 224 for the identified behavioral constraint based by performing non-linear optimization (block 316). The example non-linear calculator 222 determines portions (e.g., counts, percentages) of members of the example target region 102 satisfying the identified behavioral constraint that also satisfy the corresponding demographic constraints associated with the example aggregate demographics data 210 and the granular data 214 of the source region 104. For example, the non-linear calculator 222 determines that 8% of young females of the example target region 102 were exposed to "The Fresh Prince of Bel-Air," 4% of old females of the example target region 102 were exposed to "The Fresh Prince of Bel-Air," 10% of young males of the example target region 102 were exposed to "The Fresh Prince of Bel-Air," and 3% of old males of the example target region 102 were exposed to "The Fresh Prince of Bel-Air."

At block 318, the example non-linear calculator 222 calculates the optimization parameter for the example granular data 224 of the target region 102. For example, the non-linear calculator 222 calculates the optimization parameter based on the granular data 224 of the target region 102 calculated by the non-linear calculator 222 and the granular data 214 of the source region 104 determined by the source region determiner 204.

Upon the example linear calculator 220 or the example non-linear calculator 222 calculating the granular data 224 for the identified behavioral constraint, the example target region calculator 208 determines whether there is another behavioral constraint associated with the example aggregate tuning data 212 and the granular data 214 to be identified (block 320). If the target region calculator 208 determines that there are other behavioral constraints, the target region calculator 208 repeats blocks 310, 312, 314, 316, 318, 320 until no other behavioral constraints remain. For example, the target region calculator 208 repeats blocks 310, 312, 314, 316, 318, 320 for the "Melrose Place" constraint, the "Murder, She Wrote" constraint, etc.

If the example target region calculator 208 determines that there are no other behavioral constraints, the target region calculator 208 sets the example granular data 224 of the target region 102 (block 322). For example, the target region calculator 208 sets the granular data 224 of the target region 102 by integrating the granular data 224 calculated by the linear calculator 220 at block 314 and the granular data 224 calculated by the non-linear calculator 222 at block 316. For example, the target region calculator 208 sets the granular data 224 of the target region 102 as shown below in Table 2.

TABLE 2

|  | Young Female | Old Female | Young Male | Old Male |
|---|---|---|---|---|
| Fresh Prince of Bel-Air | 8.1001 | 4.0335 | 10.1331 | 3.0668 |
| Melrose Place | 19.6000 | 4.5333 | 7.1334 | 4.0666 |
| Murder, She Wrote | 1.5999 | 4.2003 | 2.7999 | 7.4002 |

The values provided above in Table 1 represent quantities (e.g., counts, percentages, etc.) of members of the target region 102 satisfying corresponding demographic constraints that the example target region calculator 208 calculates also satisfy corresponding behavioral constraints. For example, as provided above in Table 1, the granular data 224 set by the example target region calculator 208 indicate that 7.4002% of old males of the example target region 102 were exposed to "Murder, She Wrote."

FIG. 4 is a flow diagram representative of example machine readable instructions 316 that may be executed to implement the example non-linear calculator 222 of FIG. 2 to calculate the granular data 224 for behavioral constraints that the non-linear identifier 218 identifies as having a non-linear relationship at block 312. For example, the instructions 316 illustrated by the flow diagram of FIG. 4 may implement block 316 of FIG. 3. Initially, at block 402, the example non-linear calculator 222 of the example target region calculator 208 defines a non-linear constraint. For example, the non-linear calculator 222 defines a non-linear constraint based on the aggregate demographics data 210 and/or the aggregate tuning data 212 determined at blocks 302, 304, respectively, of FIG. 3. The example non-linear calculator 222 defines a non-linear constraint as provided below in Equation 4.

$$R_{gran} w_{dem} = R_{behav} \quad \text{Equation 4}$$

In Equation 4 provided above, $R_{gran}$ represents the granular data 224 of the target region 102 to be calculated, $w_{dem}$ represents the aggregate demographics data 210, and $R_{behav}$ represents the aggregate tuning data 212.

At block 404, the example target region calculator 208 determines whether there is another non-linear constraint to be defined. If there is another non-linear constraint, the non-linear calculator 222 repeats blocks 402, 404 until no other non-linear constraints remain to be defined. For example, the non-linear calculator 222 repeats blocks 402, 404 to define a lower and upper bounds constraint, $0 \leq R_{source} \leq 100$, in which $R_{source}$ represents the granular data 214.

At block 406 the example target region calculator 208 constructs a non-linear equation to be optimized. For example, the non-linear calculator 222 constructs the example non-linear equation based on the example granular data 214 of the source region 104 and the example importance matrix 216. The example non-linear calculator 222 constructs Equation 5 as provided below.

$$\|(R_{gran} - R_{source}) M\|_2 \quad \text{Equation 5}$$

In Equation 5 provided above, $R_{gran}$ represents the example granular data 224 to be calculated by the target region calculator 208, $R_{source}$ represents the example granular data 214 of the source region 104, and M represents the importance matrix 216.

At block 408, the example non-linear calculator 222 performs non-linear optimization of the non-linear equation constructed at block 406 to apportion the aggregate tuning data 212 corresponding to the behavioral constraint identified at block 310 of FIG. 3. For example, the non-linear calculator 222 performs the non-linear optimization by minimizing the non-linear equation constructed at block 406 subject to the non-linear constraint(s) defined at block 402. By performing the non-linear optimization, the example non-linear calculator 222 apportions the value of the aggregate tuning data 212 associated with the identified behavioral constraint (e.g., the "Fresh Prince of Bel-Air" constraint) among the demographic constraints associated with the aggregate demographics data 210 and the granular data 214 (e.g., the "young female" constraint, the "old female" constraint, the "young male" constraint, and the "old male" constraint).

At block 410, the example non-linear calculator 222 identifies one of the demographic constraints associated with the aggregate demographics data 210 and the granular data 214. For example, the non-linear calculator 222 identifies the "young female" demographic constraint. The example non-linear calculator 222 determines a value for a quantity (e.g., a count, a percentage) of members of the target region 102 (e.g., the example members 114a, 114b, 114c of FIG. 1) satisfying the identified demographic constraint that also satisfy the identified behavioral constraint (block 412). For example, the non-linear calculator 222 determines a quantity of '8.1001' that indicates 8.1001% of young females of the target region 102 were exposed to the "Fresh Prince of Bel-Air."

At block 414, the example non-linear calculator 222 determines whether there is another demographic constraint to identify. For example, the non-linear calculator 222 determines whether there is another demographic constraint associated with the aggregate demographics data 210 and the granular data 214. If the non-linear calculator 222 determines that there is another demographic constraint, the non-linear calculator 222 repeats blocks 410, 412, 414 for the other demographic constraints. For example, the non-linear calculator 222 repeats blocks 410, 412, 414 for the "old female" constraint, the "young male" constraint, and the "old male" constraint. If the example non-linear calculator 222 determines that there are no other constraints, the non-linear calculator 222 sets the values determined at block 412 as the granular data 224 of the target region 102 for the behavioral constraint identified at block 310 (block 416). For example, the non-linear calculator 222 sets the granular data 224 for the identified behavioral constraint as shown below in Table 3.

TABLE 3

|  | Young Female | Old Female | Young Male | Old Male |
|---|---|---|---|---|
| Fresh Prince of Bel-Air | 8.1001 | 4.0335 | 10.1331 | 3.0668 |

FIG. 5 is a flow diagram representative of example machine readable instructions 318 that may be executed to implement the example non-linear calculator 222 of FIG. 2 to calculate the optimization parameter associated with the granular data 224 of the target region 102. For example, the instructions 318 illustrated by the flow diagram of FIG. 5 may implement block 318 of FIG. 3. Initially, at block 502, the example non-linear calculator 222 of the example target region calculator 208 identifies a combination of the behavioral constraint identified at block 310 of FIG. 3 and one of the demographic constraints associated with the aggregate demographics data 210 and the granular data 214. For example, the non-linear calculator 222 identifies a combination of the "Fresh Prince of Bel-Air" behavioral constraint and the "young female" demographic constraint.

At block 504, the example non-linear calculator 222 obtains a value associated with the combination from the granular data 224 of the target region 102 calculated by the non-linear calculator 222 at block 316 of FIG. 3 and/or via the machine readable instructions 316 of FIG. 4. For example, the non-linear calculator 222 obtains a value of '8.1001' from the granular data 224. At block 506, the example target region calculator 208 obtains a value associated with the identified combination from the granular data 214 of the source region 104 determined by the source region determiner at block 306 of FIG. 3. For example, the non-linear calculator 222 obtains a value of '8' from the granular data 214.

At block 508, the example target region calculator 208 calculates a variance based on the value obtained from the granular data 224 of the target region 102 and the value obtained from the granular data 214 of the source region 104. The example target region calculator 208 adds the variance calculated at block 508 to a value of the optimization parameter (block 510). For example, the optimization parameter initially has a value of '0' and subsequently increases by a value of the variance calculated at block 508.

At block 512, the example target region calculator 208 determines whether there is another combination of constraints for the behavioral constraint identified at block 310 of FIG. 3. If the target region calculator 208 determines that there are other combinations, blocks 502, 504, 506, 508, 510, 512. In such examples, the target region calculator 208 incrementally increases the value of the optimization parameter as blocks 502, 504, 506, 508, 510, 512 are repeated by the target region calculator 208. Further, the value of the optimization parameter tolls as the instructions 318 of FIG. 5 are repeated for other behavioral constraints identified at block 310 of FIG. 3. For example, the value of the optimization parameter continues to toll as the instructions of FIG. 5 are repeated for the "Melrose Place" behavioral constraint and the "Murder, She Wrote" behavioral constraint. Based on the example granular data 214 and the example granular data 224, the example target region calculator 208 calculates the value of the optimization parameter as '8.4715.'

FIGS. 6-9 describe an example environment 600 in which an Online Campaign Ratings (OCR) system developed by The Nielsen Company (US), LLC is employed to monitor online activity. In the environment 600 in which the OCR system is employed, beacon instructions are downloaded to a client (e.g., a media presentation device) when the client requests media. The beacon instructions are, thus, executed whenever the media is accessed, be it from a server or from a cache. The beacon instructions cause monitoring data reflecting information about the access to the media to be sent from the client that downloaded the media to a monitoring entity (e.g., an audience measurement entity). Because the beaconing instructions are associated with the media and executed by a client browser whenever the media is accessed, the monitoring information is provided to the AME irrespective of whether the client is a panelist of the AME.

Figure 6:
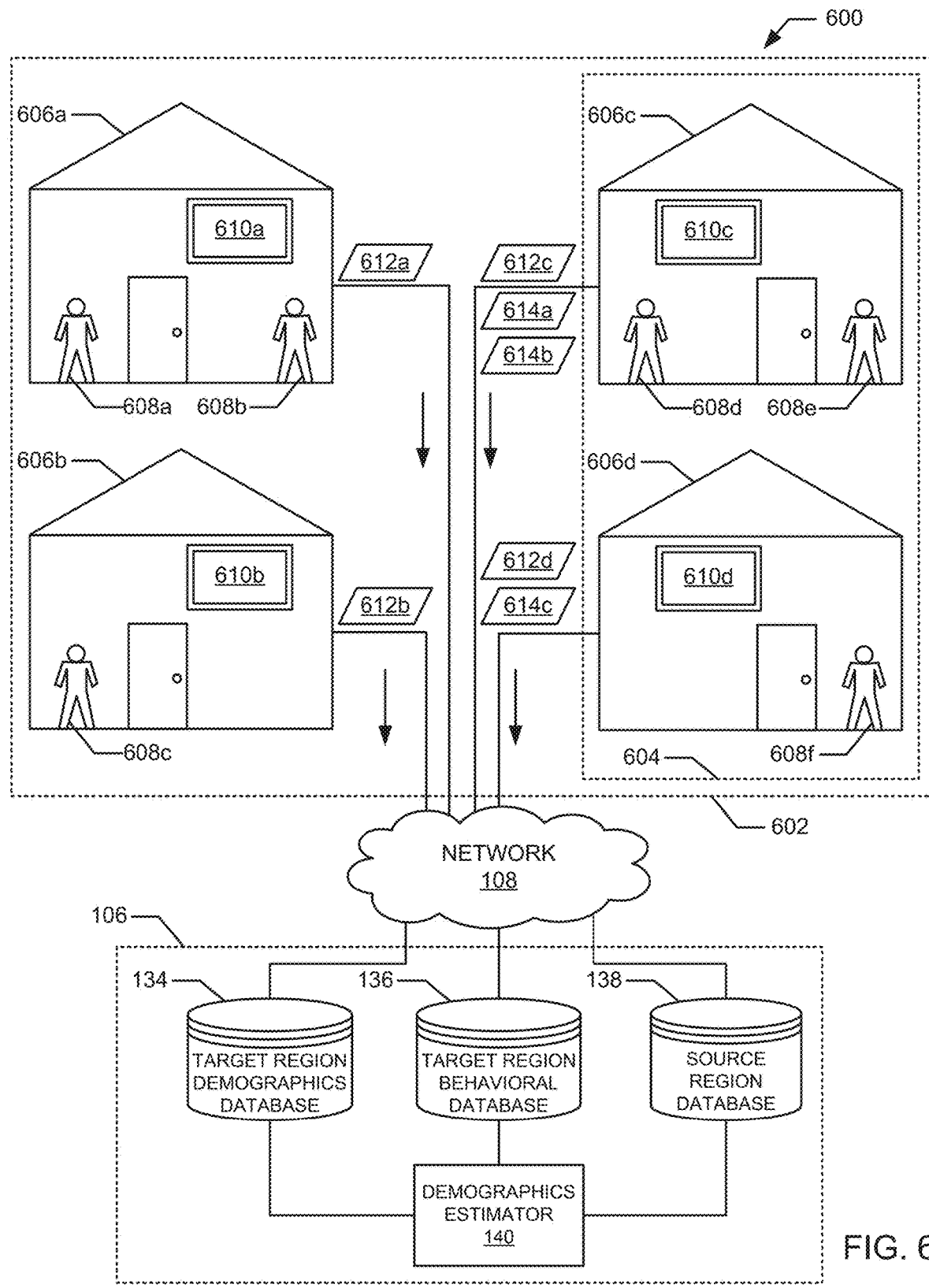
FIG. 6 is a block diagram of an example environment for online media campaign measurement in which aggregate data of a target region and granular data of a source region may be collected to calculate granular data of the target region in accordance with the teachings of this disclosure.
Figure 7:
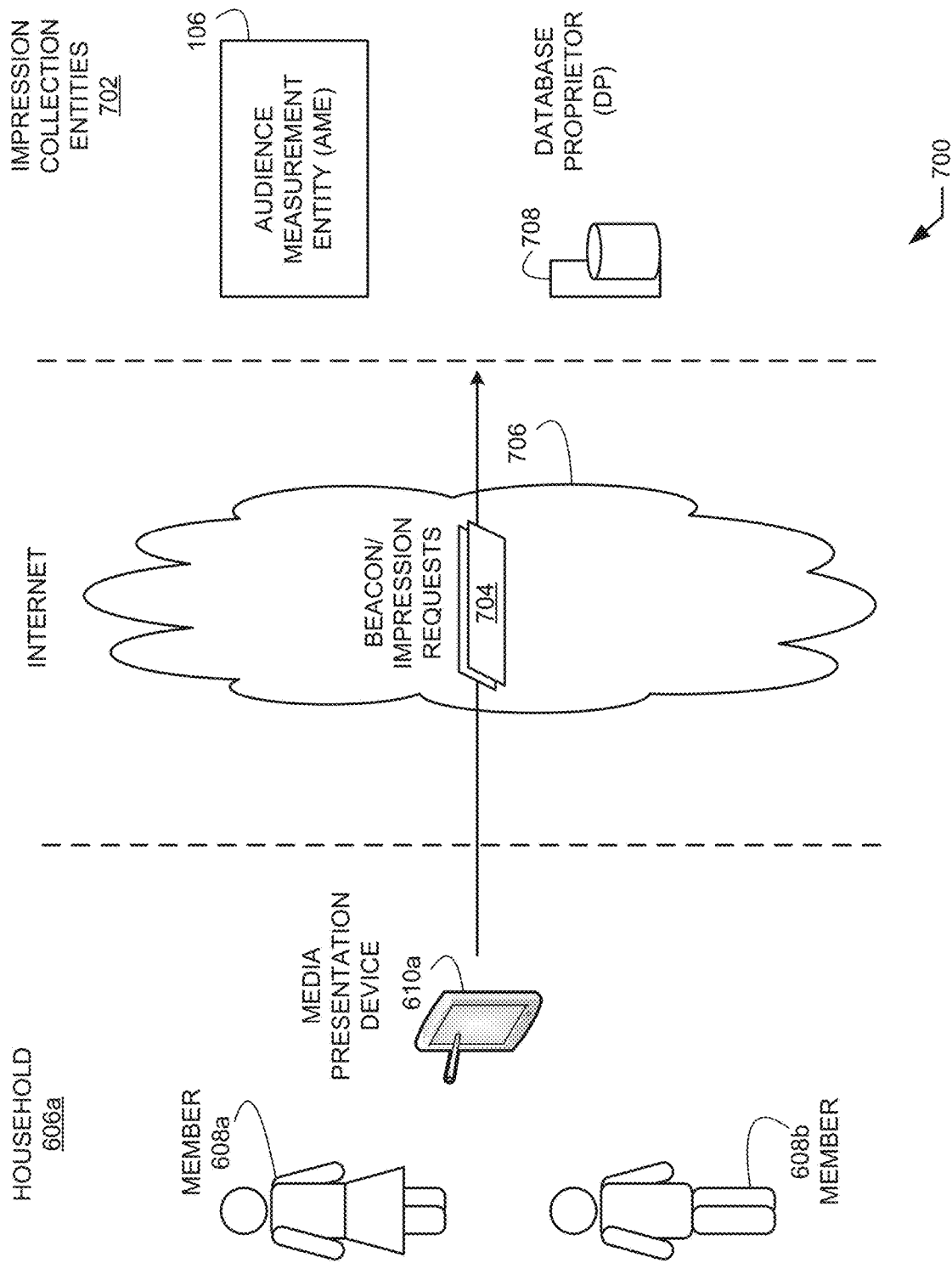
FIG. 7 is a block diagram of an example environment in which the example media presentation device of FIG. 6 reports audience impressions of media to impression collection entities to facilitate audience measurement for media.
Figure 8:
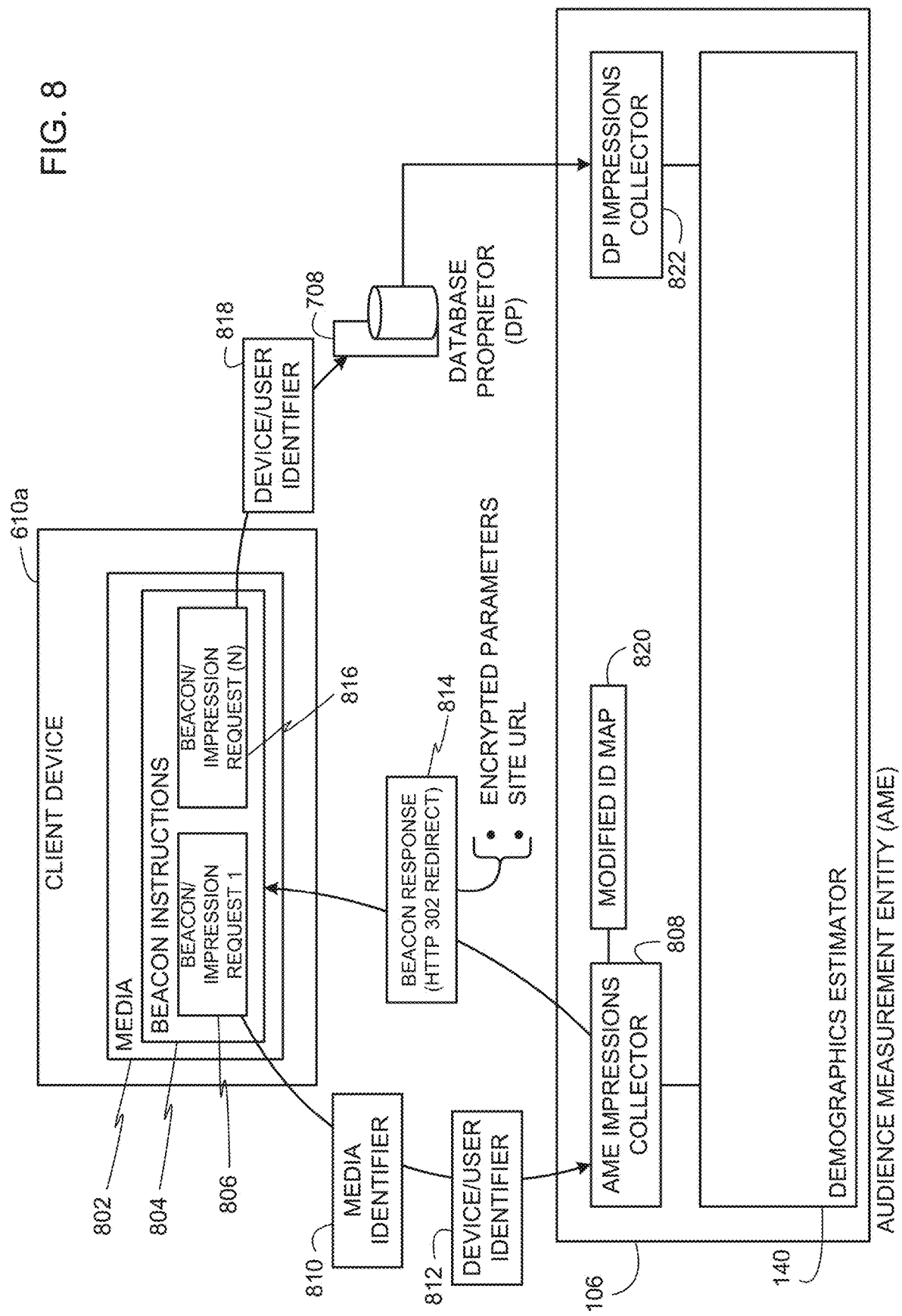
FIG. 8 is an example communication flow diagram illustrating an example manner in which the audience measurement entity of FIGS. 6 and 7 and a database proprietor of FIG. 7 collect data from the example media presentation device of the source region of FIG. 6.
Figure 9:
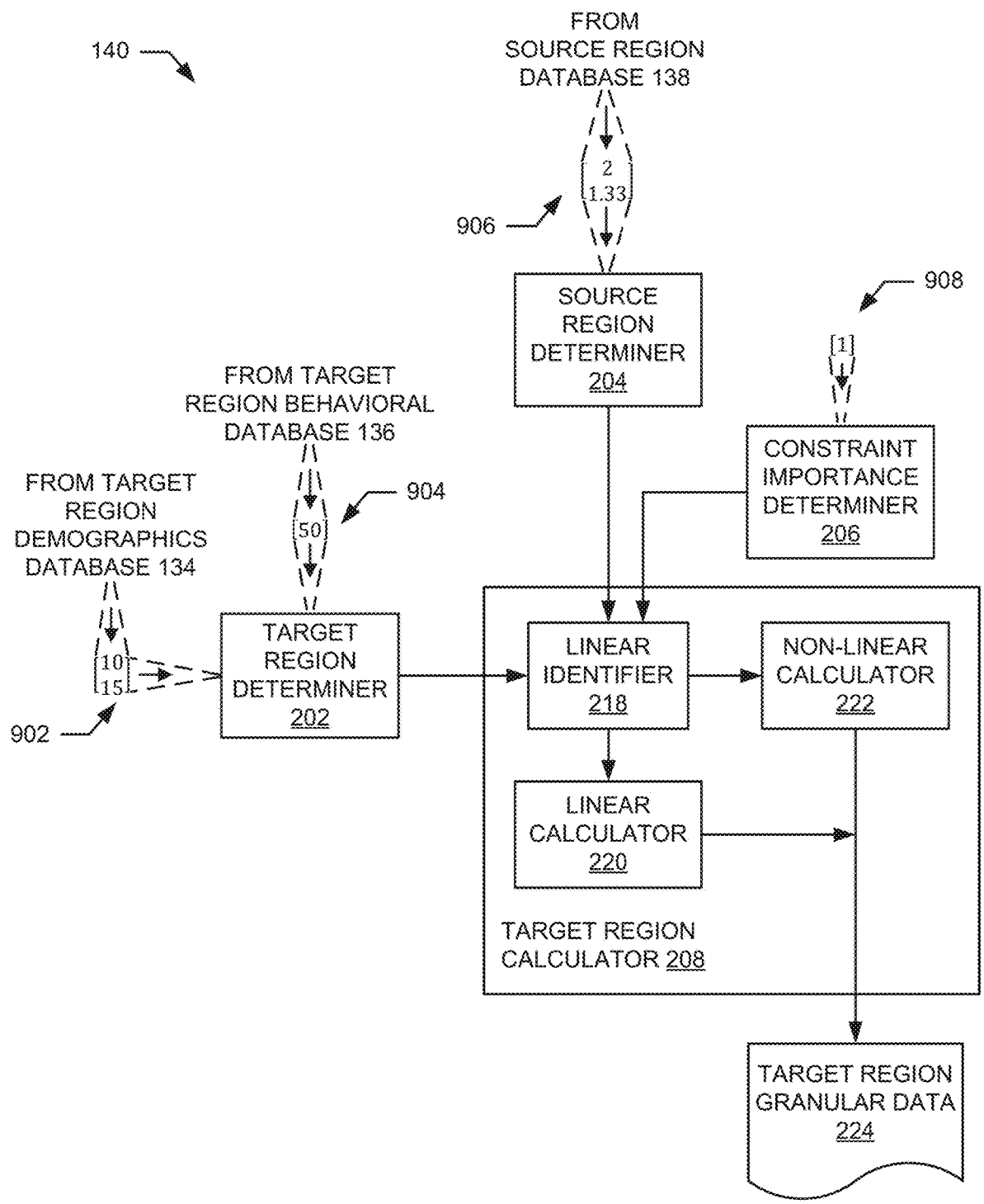
FIG. 9 is a block diagram of an example implementation of the demographics estimator of FIG. 6 that is to calculate the granular data of the target region of the online media environment of FIG. 6.

The disclosed methods, apparatus and articles of manufacture of FIGS. 6-9 enable to calculate scaling values or weights that correct for online impressions that are not associated with demographic constraints of interest (e.g., non-count or under-representation). As described in further detail below, FIG. 6 is a block diagram of the example environment 600 in which an OCR system is employed for online media campaign measurement. The example environment 600 of FIG. 6 includes a region (e.g., a target region 602) in which online activity is monitored and a sub-region of panelists (e.g., a source region 604) of the region. Further, FIG. 7 is a block diagram of an example environment 700 in which example media presentation device reports audience impressions of media to impression collection entities to facilitate audience measurement, FIG. 8 is an example communication flow diagram illustrating collection of data in an OCR system, FIG. 9 is a block diagram of an example implementation of an example demographics estimator that is to calculate scaling values or weights to correct for non-count.

FIG. 6 is a block diagram of the example environment 600 that includes the example target region 602, the example source region 604, the example AME 106, and the example network 108. The example AME 106 and the example network 108 of FIG. 6 are substantially similar to or identical to those components having the same reference numbers in FIG. 1, are described above in further detail in connection with FIG. 1, and will not be described in detail again.

In the illustrated example of FIG. 6, the target region 602 (e.g., a population) includes households 606a, 606b (e.g., non-panelist households) and households 606c, 606d (e.g., panelist households), and the source region 604 (e.g., a sub-region of the population) includes the households 606c, 606d (e.g., panelist households).

The example households 606a, 606b, 606c, 606d of the example environment 600 include example members 608a, 608b, 608c, 608d, 608e, 608f and example media presentation devices 610a, 610b, 610c, 610d. For example, the household 606a includes the members 608a, 608b and the media presentation device 610a, the household 606b includes the member 608c and the media presentation device 610b, the household 606c includes the members 608d, 608e and the media presentation device 610c, and the household 606d includes the member 608f and the media presentation device 610d.

In some examples, the households 606a, 606b, 606c, 606d are representative of many other households (e.g., other households of a non-panelist region) that may be included in the example target region 602. Additionally or alternatively, the households 606c, 606d are representative of many other households (e.g., other panelist households) that may be included in the example source region 604. Characteristics of the other households (e.g., a number of household members, demographics of the household members, a number of televisions, etc.) may be similar to and/or different from those of the representative households 606a, 606b, 606c, 606d. For example, other households include one member, two members, three members, four members, etc.

The media presentation devices 610a, 610b, 610c, 610d (e.g., client devices) of the illustrated example include devices capable of accessing media over a network. For example, the media presentation devices 610a 610b, 610c, 610d include computers, tablets, mobile devices, smart televisions, or other Internet-capable devices or appliances. The example media presentation devices 610a, 610b, 610c, 610d are used to collect corresponding example impression data 612a, 612b, 612c, 612d (e.g., behavioral data) for media accessed via the media presentation devices 610a, 610b, 610c, 610d.

Further, as illustrated in FIG. 6, the example members 608d, 608e, 608f (e.g., panelists) of the example source region 604 (e.g., a panelist sub-region of the population) provide respective example demographics data 614a, 614b, 614c. For example, the demographics data 614a includes person-specific information associated with the member 608d, the demographics data 614b includes person-specific information associated with the member 608e, and the demographics data 614c includes person-specific information associated with the member 608f. The demographics data 614a, 614b, 614c of the illustrated example identify which demographic constraints (e.g., demographic marginals of respective demographic dimensions, combinations of demographic marginals of combinations of respective demographic dimensions, etc.) are associated with the corresponding members 608d, 608e, 608f of the source region 104. For example, the demographics data 614a indicates that the member 608d satisfies the "male" demographic constraint, the demographics data 614b indicates that the member 608e satisfies the "female" demographic constraint, and the demographics data 614c indicates that the member 608f satisfies the "female" demographic constraint. The demographics data 614a, 614b, 614c may be provided by the members 608d, 608e, 608f via, for example, self-reporting, responding to surveys, etc.

The example demographics estimator 140 of the AME 106 of FIG. 6 utilizes the collected impressions data 612a, 612b, 612c, 612d of the target region 602 (e.g., the population), the demographics data 614a, 614b, 614c of the source region 604 (e.g., the panelist sub-region of the population), and demographics data of a database proprietor (e.g. a database proprietor 708 of FIGS. 7 and 8) to calculate scaling values or weights for demographic constraints of interest (e.g., granular data) for the target region 602. For example, the demographics estimator 140 calculates the scaling values to determine quantities of impressions of the example target region 602 that are associated with demographics constraints of interest (e.g., the "male" demographic constraint, the "female" demographic constraint).

In some examples, the AME 106, the database proprietor (e.g. the database proprietor 708 of FIGS. 7 and 8) and/or the other entity associates an impression of online activity from the target region 602 with demographics of a person (e.g., the example members 608a, 608b, 608c, 608d, 608e, 608f) corresponding to the impression. In the illustrated example, the example target region demographics database 134 stores aggregate demographics data for members (e.g., the example members 608a, 608b, 608c, 608d, 608e, 608f) of the target region 602. For example, the aggregate demographics data stored by the target region demographics database 134 are obtained from a database proprietor (e.g., Facebook, Twitter, MySpace, Yahoo!, Google, Amazon.com, Buy.com, Experian, etc.) that has collected the demographics data from the members of the target region 602. Further, the example target region behavioral database 136 stores the recorded impressions of online activity (e.g., aggregate behavioral data) of the target region 602. For example, the target region behavioral database 136 stores the example impressions data 612a, 612b, 612c, 612d collected from the example media presentation devices 610a, 610b, 610c, 610d of the target region 602.

Further, based on the demographics data (e.g., the example demographics data 614a, 614b, 614c) collected from the panelists (e.g., the example members 608d, 608e, 608f) of the source region 604 (e.g., the panelist sub-region of the population), the example AME 106, the database proprietor and/or another entity identifies a quantity (e.g., a count, a percentage) of impressions of online activity associated with panelists (e.g., the example members 608d, 608e, 608f) for which corresponding demographic constraints of interest are identified. For example, the AME 106, the database proprietor and/or the other entity determines that 50% of impressions deriving from a male panelist are recorded as being associated with a male, and 75% of impressions deriving from a female panelist are recorded as being associated with a female. The example source region database 138 of FIG. 6 stores the recorded impressions of online activity and the demographics associated with the recorded impressions (e.g., granular data) of the example source region 604.

In some examples, the AME 106, a database proprietor and/or another entity are unable to associate a recorded impression with a demographic constraint of interest, thereby resulting in incomplete demographic impression data (e.g., data indicating characteristics of the people associated with the corresponding recorded impressions) of the target region 602.

Based on the data stored in the target region demographics database 134, the target region behavioral database 136, and the source region database 138, the example demographics estimator 140 calculates scaling values or weights for the example target region 602 (e.g., granular data of the target region 602) to determine quantities of impressions of online activity associated with the demographic constraints of interest.

FIG. 7 is a block diagram of the example environment 700 in which the example media presentation device 610a of the source region of FIG. 6 reports audience impressions of media to impression collection entities 702 to facilitate identifying total impressions and sizes of unique audiences exposed to different media. As used herein, the term impression collection entity refers to any entity that collects impression data. In the illustrated example, the media presentation device 610a employs a web browser and/or applications (e.g., apps) to access media, some of which include instructions that cause the media presentation device 610a to report media monitoring information to one or more of the impression collection entities 702. That is, when the media presentation device 610a of the illustrated example accesses media, a web browser and/or application of the media presentation device 610a executes instructions in the media to send a beacon request or impression request 704 to one or more of the impression collection entities 702 via, for example, the Internet 706. The beacon requests 704 of the illustrated example include information about accesses to media at the media presentation device 610a. Such beacon requests 704 allow monitoring entities, such as the impression collection entities 702, to collect impressions for different media accessed via the media presentation device 610a. In this manner, the impression collection entities 702 can generate large impression quantities for different media (e.g., different content and/or advertisement campaigns).

The impression collection entities 702 of the illustrated example include the AME 106 and an example database proprietor (DP) 708. In the illustrated example, the AME 106 does not provide the media to the media presentation device 610a and is a trusted (e.g., neutral) third party (e.g., The Nielsen Company, LLC) for providing accurate media access statistics. In the illustrated example, the database proprietor 708 is one of many database proprietors that operates on the Internet to provide services to large numbers of subscribers. Such services may be email services, social networking services, news media services, cloud storage services, streaming music services, streaming video services, online retail shopping services, credit monitoring services, etc. Example database proprietors include social network sites (e.g., Facebook, Twitter, MySpace, etc.), multi-service sites (e.g., Yahoo!, Google, etc.), online retailer sites (e.g., Amazon.com, Buy.com, etc.), credit reporting services (e.g., Experian) and/or any other web service(s) site that maintains user registration records. In examples disclosed herein, the database proprietor 708 maintains user account records corresponding to users registered for Internet-based services provided by the database proprietors. That is, in exchange for the provision of services, subscribers register with the database proprietor 708. As part of this registration, the subscribers provide detailed demographic information to the database proprietor 708. Demographic information may include, for example, gender, age, ethnicity, income, home location, education level, occupation, etc. In the illustrated example, the database proprietor 708 sets a device/user identifier (e.g., an identifier described below in connection with FIG. 8) on a subscriber's media presentation device 610a that enables the database proprietor 708 to identify the subscriber.

In the illustrated example, when the database proprietor 708 receives a beacon/impression request 704 from the media presentation device 610a, the database proprietor 708 requests the media presentation device 610a to provide the device/user identifier that the database proprietor 708 had previously set for the media presentation device 610a. The database proprietor 708 uses the device/user identifier corresponding to the media presentation device 610a to identify demographic information in its user account records corresponding to the subscriber of the media presentation device 610a. In this manner, the database proprietor 708 can generate demographic impressions by associating demographic information with an audience impression for the media accessed at the media presentation device 610a. As explained above, a demographic impression is an impression that is associated with a characteristic (e.g., a demographic characteristic) of the person exposed to the media.

In some examples, the database proprietor 708 is unable to identify the device/user identifier corresponding to the media presentation device 610a in its user account records. As a result, the database proprietor 708 is unable to identify demographic information from its user account records that correspond to the media presentation device 610a and/or the members 608a, 608b using the media presentation device 610a for the received beacon/impression request 704. In such examples, the database proprietor 708 records the received beacon/impression request 704 in a total impression count but does not record the beacon/impression request 704 in an impression count for a demographic constraint of interest (e.g., a "male" constraint, a "female" constraint). As used herein, a "non-count" or an "under-representation" refers to an impression that is recorded in a total impression count but is not recorded in an impression count for a demographic constraint of interest (e.g., a demographic impression).

Further, in some examples, the AME 106 establishes an AME panel of users (e.g., the example members 608d, 608e, 608f of the example source region 604 of FIG. 6) who have agreed to provide their demographic information and to have their Internet browsing activities monitored. Those members 608d, 608e, 608f provide detailed information concerning the person's identity and demographics (e.g., the corresponding example demographics data 614a, 614b, 614c of FIG. 6) to the AME 106. The AME 106 sets a device/user identifier (e.g., an identifier described below in connection with FIG. 2) on the media presentation device (e.g., the example media presentation devices 610c, 610d of FIG. 6) corresponding to the panelist (e.g., the members 608d, 608e, 608f) that enables the AME 106 to identify the panelist. An AME panel may be a cross-platform home television/computer (TVPC) panel built and maintained by the AME 106. In other examples, the AME panel may be a computer panel or internet-device panel without corresponding to a television audience panel. In yet other examples, the AME panel may be a cross-platform radio/computer panel and/or a panel formed for other mediums.

In such examples, when the AME 106 receives a beacon request 704 from the media presentation device (e.g., the media presentation devices 610c, 610d) of the source region 604, the AME 106 requests the media presentation device to provide the AME 106 with the device/user identifier that the AME 106 previously set in the media presentation device. The AME 106 uses the device/user identifier corresponding to the media presentation device 610a to identify demographic information in its user records corresponding to the panelist of the media presentation device of the source region 604. In this manner, the AME 106 can generate demographic impressions (e.g., granular data of the source region 604) by associating demographic information (e.g., the example demographics data 614a, 614b, 614c of the source region 604 of FIG. 6) with an audience impression (e.g., the example impressions data 612c, 612d of the source region 604 of FIG. 6) for the media accessed in the source region. In some examples, members (e.g., the members 608d, 608e) share a media presentation device (e.g., the media presentation device 610c) to access the internet-based service of the database proprietor 708 and to access other media via the Internet 706. In the illustrated example, when the database proprietor 708 receives a beacon/impression request 704 for media accessed via the media presentation device 610c, the database proprietor 708 logs an impression for the media access as corresponding to the member 608d, 608e of the household 606c that most recently logged into the database proprietor 708.

FIG. 8 is an example communication flow diagram illustrating an example manner in which the audience measurement entity 106 and the example database proprietor 708 collect data from the media presentation device 610a of the example source region 604. For example, FIG. 8 illustrates an example manner in which the AME 106 and the database proprietor 708 of FIG. 1 can collect impressions and demographic information based on the media presentation device 610*a* reporting impressions to the AME 106 and the database proprietor 708. In the illustrated example, the demographics estimator 140 is to correct for non-count or under-representation by the database proprietor 708. The example chain of events shown in FIG. 8 occurs when the media presentation device 610*a* accesses media for which the media presentation device 610*a* reports an impression to the AME 106 and the database proprietor 708. In some examples, the media presentation device 610*a* reports impressions for accessed media based on instructions (e.g., beacon instructions) embedded in the media that instruct the media presentation device 610*a* (e.g., instruct a web browser or an app in the media presentation device 610*a*) to send beacon/impression requests (e.g., the beacon/impression requests 704 of FIG. 1) to the AME 106 and/or the database proprietor 708. In such examples, the media having the beacon instructions is referred to as tagged media. In other examples, the media presentation device 610*a* reports impressions for accessed media based on instructions embedded in apps or web browsers that execute on the media presentation device 610*a* to send beacon/impression requests (e.g., the beacon/impression requests 704 of FIG. 1) to the AME 106, and/or the database proprietor 708 for corresponding media accessed via those apps or web browsers. In any case, the beacon/impression requests (e.g., the beacon/impression requests 704 of FIG. 7) include device/user identifiers (e.g., AME IDs and/or DP IDs) as described further below to allow the corresponding AME 106 and/or database proprietor 708 to associate demographic information with resulting logged impressions.

In the illustrated example, the media presentation device 610*a* accesses media 802 tagged with beacon instructions 804. The beacon instructions 804 cause the media presentation device 610*a* to send a beacon/impression request 806 to an AME impressions collector 808 when the media presentation device 610*a* accesses the media 802. For example, a web browser and/or app of the media presentation device 610*a* executes the beacon instructions 804 in the media 802 which instruct the browser and/or app to generate and send the beacon/impression request 806. In the illustrated example, the media presentation device 610*a* sends the beacon/impression request 806 to the AME impression collector 808 using an HTTP (hypertext transfer protocol) request addressed to the URL (uniform resource locator) of the AME impressions collector 808 at, for example, a first internet domain of the AME 106. The beacon/impression request 806 of the illustrated example includes a media identifier 810 (e.g., an identifier that can be used to identify content, an advertisement, and/or any other media) corresponding to the media 802. In some examples, the beacon/impression request 806 also includes a site identifier (e.g., a URL) of the website that served the media 802 to the media presentation device 610*a* and/or a host website ID (e.g., www.acme.com) of the website that displays or presents the media 802. In the illustrated example, the beacon/impression request 806 includes a device/user identifier 812. In the illustrated example, the device/user identifier 812 that the media presentation device 610*a* provides in the beacon impression request 806 is an AME ID because it corresponds to an identifier that the AME 106 uses to identify a user (e.g., the example members 608*a*, 608*b* of FIG. 6) corresponding to the media presentation device 610*a*. In other examples, the media presentation device 610*a* may not send the device/user identifier 812 until the media presentation device 610*a* receives a request for the same from a server of the AME 106 (e.g., in response to, for example, the AME impressions collector 808 receiving the beacon/impression request 806).

In some examples, the device/user identifier 812 may be a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, and/or any other identifier that the AME 106 stores in association with demographic information about users of the media presentation devices (e.g., the media presentation devices 610*a*, 610*b*, 610*c* of FIG. 6). When the AME 106 receives the device/user identifier 812, the AME 106 can obtain demographic information corresponding to a user of the media presentation device 610*a* based on the device/user identifier 812 that the AME 106 receives from the media presentation device 610*a*. In some examples, the device/user identifier 812 may be encrypted (e.g., hashed) at the media presentation device 610*a* so that only an intended final recipient of the device/user identifier 812 can decrypt the hashed identifier 812. For example, if the device/user identifier 812 is a cookie that is set in the media presentation device 610*a* by the AME 106, the device/user identifier 812 can be hashed so that only the AME 106 can decrypt the device/user identifier 812. If the device/user identifier 812 is an IMEI number, the media presentation device 610*a* can hash the device/user identifier 812 so that only a wireless carrier (e.g., the database proprietor 708) can decrypt the hashed identifier 812 to recover the IMEI for use in accessing demographic information corresponding to the user of the media presentation device 610*a*. By hashing the device/user identifier 812, an intermediate party (e.g., an intermediate server or entity on the Internet) receiving the beacon request cannot directly identify a user of the media presentation device 610*a*.

In response to receiving the beacon/impression request 806, the AME impressions collector 808 logs an impression for the media 802 by storing the media identifier 810 contained in the beacon/impression request 806. In the illustrated example of FIG. 8, the AME impressions collector 808 also uses the device/user identifier 812 in the beacon/impression request 806 to identify AME panelist demographic information corresponding to a panelist of the media presentation device 610*a*. That is, the device/user identifier 812 matches a user ID of a panelist member (e.g., a panelist corresponding to a panelist profile maintained and/or stored by the AME 106). In this manner, the AME impressions collector 808 can associate the logged impression with demographic information of a panelist corresponding to the media presentation device 610*a*. Additionally or alternatively, the AME 106 may obtain demographics information from the database proprietor 708 for the logged impression if the media presentation device 610*a* corresponds to a subscriber of the database proprietor 708.

In the illustrated example of FIG. 8, to compare or supplement panelist demographics (e.g., for accuracy or completeness) of the AME 106 with demographics from one or more database proprietors (e.g., the database proprietor 708), the AME impressions collector 808 returns a beacon response message 814 (e.g., a first beacon response) to the media presentation device 610*a* including an HTTP "302 Found" re-direct message and a URL of a participating database proprietor 708 at, for example, a second internet domain. In the illustrated example, the HTTP "302 Found"

re-direct message in the beacon response 814 instructs the media presentation device 610a to send a second beacon request 816 to the database proprietor 708. In other examples, instead of using an HTTP "302 Found" re-direct message, redirects may be implemented using, for example, an iframe source instruction (e.g., <iframe src=" ">) or any other instruction that can instruct a client device to send a subsequent beacon request (e.g., the second beacon request 816) to a participating database proprietor 708. In the illustrated example, the AME impressions collector 808 determines the database proprietor 708 specified in the beacon response 814 using a rule and/or any other suitable type of selection criteria or process. In some examples, the AME impressions collector 808 determines a particular database proprietor to which to redirect a beacon request based on, for example, empirical data indicative of which database proprietor is most likely to have demographic data for a user corresponding to the device/user identifier 812. In some examples, the beacon instructions 804 include a predefined URL of one or more database proprietors to which the media presentation device 610a should send follow up beacon requests 816. In other examples, the same database proprietor is always identified in the first redirect message (e.g., the beacon response 814).

In the illustrated example of FIG. 8, the beacon/impression request 816 may include a device/user identifier 818 that is a DP ID because it is used by the database proprietor 708 to identify a subscriber of the media presentation device 610a when logging an impression. In some instances (e.g., in which the database proprietor 708 has not yet set a DP ID in the media presentation device 610a), the beacon/impression request 816 does not include the device/user identifier 818. In some examples, the DP ID is not sent until the DP requests the same (e.g., in response to the beacon/impression request 816). In some examples, the device/user identifier 818 is a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, and/or any other identifier that the database proprietor 708 stores in association with demographic information about subscribers corresponding to the media presentation devices (e.g., the example media presentation devices 610a, 610b, 610c of FIG. 6). When the database proprietor 708 receives the device/user identifier 818, the database proprietor 708 can obtain demographic information corresponding to a user of the media presentation device 610a based on the device/user identifier 818 that the database proprietor 708 receives from the media presentation device 610a. In some examples, the device/user identifier 818 may be encrypted (e.g., hashed) at the media presentation device 610a so that only an intended final recipient of the device/user identifier 818 can decrypt the hashed identifier 818. For example, if the device/user identifier 818 is a cookie that is set in the media presentation device 610a by the database proprietor 708, the device/user identifier 818 can be hashed so that only the database proprietor 708 can decrypt the device/user identifier 818. If the device/user identifier 818 is an IMEI number, the media presentation device 610a can hash the device/user identifier 818 so that only a wireless carrier (e.g., the database proprietor 708) can decrypt the hashed identifier 818 to recover the IMEI for use in accessing demographic information corresponding to the user of the media presentation device 610a. By hashing the device/user identifier 818, an intermediate party (e.g., an intermediate server or entity on the Internet) receiving the beacon request cannot directly identify a user of the media presentation device 610a. For example, if the intended final recipient of the device/user identifier 818 is the database proprietor 708, the AME 106 cannot recover identifier information when the device/user identifier 818 is hashed by the media presentation device 610a for decrypting only by the intended database proprietor 708.

In some examples that use cookies as the device/user identifier 818, when a user deletes a database proprietor cookie from the media presentation device 610a, the database proprietor 708 sets the same cookie value in the media presentation device 610a the next time the user logs into a service of the database proprietor 708. In such examples, the cookies used by the database proprietor 708 are registration-based cookies, which facilitate setting the same cookie value after a deletion of the cookie value has occurred on the media presentation device 610a. In this manner, the database proprietor 708 can collect impressions for the media presentation device 610a based on the same cookie value over time to generate unique audience (UA) sizes while eliminating or substantially reducing the likelihood that a single unique person will be counted as two or more separate unique audience members.

Although only a single database proprietor 708 is shown in FIGS. 7 and 8, the impression reporting/collection process of FIGS. 7 and 8 may be implemented using multiple database proprietors. In some such examples, the beacon instructions 804 cause the media presentation device 610a to send beacon/impression requests 816 to numerous database proprietors. For example, the beacon instructions 804 may cause the media presentation device 610a to send the beacon/impression requests 816 to the numerous database proprietors in parallel or in daisy chain fashion. In some such examples, the beacon instructions 804 cause the media presentation device 610a to stop sending beacon/impression requests 816 to database proprietors once a database proprietor has recognized the media presentation device 610a. In other examples, the beacon instructions 804 cause the media presentation device 610a to send beacon/impression requests 816 to database proprietors so that multiple database proprietors can recognize the media presentation device 610a and log a corresponding impression. In any case, multiple database proprietors are provided the opportunity to log impressions and provide corresponding demographics information if the user of the media presentation device 610a is a subscriber of services of those database proprietors.

In some examples, prior to sending the beacon response 814 to the media presentation device 610a, the AME impressions collector 808 replaces site IDs (e.g., URLs) of media provider(s) that served the media 802 with modified site IDs (e.g., substitute site IDs) which are discernable only by the AME 106 to identify the media provider(s). In some examples, the AME impressions collector 808 may also replace a host website ID (e.g., www.acme.com) with a modified host site ID (e.g., a substitute host site ID) which is discernable only by the AME 106 as corresponding to the host website via which the media 802 is presented. In some examples, the AME impressions collector 808 also replaces the media identifier 810 with a modified media identifier 810 corresponding to the media 802. In this way, the media provider of the media 802, the host website that presents the media 802, and/or the media identifier 810 are obscured from the database proprietor 708, but the database proprietor 708 can still log impressions based on the modified values which can later be deciphered by the AME 106 after the AME 106 receives logged impressions from the database proprietor 708. In some examples, the AME impressions collector 808 does not send site IDs, host site IDS, the media identifier 810 or modified versions thereof in the beacon response 814. In such examples, the media presentation device 610a provides the original, non-modified versions of the media identifier 810, site IDs, host IDs, etc. to the database proprietor 708.

In the illustrated example, the AME impression collector 808 maintains a modified ID mapping table 820 that maps original site IDs with modified (or substitute) site IDs, original host site IDs with modified host site IDs, and/or maps modified media identifiers to the media identifiers such as the media identifier 810 to obfuscate or hide such information from database proprietors such as the database proprietor 708. Also in the illustrated example, the AME impressions collector 808 encrypts all of the information received in the beacon/impression request 806 and the modified information to prevent any intercepting parties from decoding the information. The AME impressions collector 808 of the illustrated example sends the encrypted information in the beacon response 814 to the media presentation device 610a so that the media presentation device 610a can send the encrypted information to the database proprietor 708 in the beacon/impression request 816. In the illustrated example, the AME impressions collector 808 uses an encryption that can be decrypted by the database proprietor 708 site specified in the HTTP "302 Found" re-direct message. Periodically or aperiodically, the impression data collected by the database proprietor 708 is provided to a DP impressions collector 822 of the AME 106 as, for example, batch data.

Additional examples that may be used to implement the beacon instruction processes of FIG. 8 are disclosed in Mainak et al., U.S. Pat. No. 8,370,489, which is hereby incorporated herein by reference in its entirety. In addition, other examples that may be used to implement such beacon instructions are disclosed in Blumenau, U.S. Pat. No. 6,108,637, which is hereby incorporated herein by reference in its entirety.

Returning to the example demographics estimator 140, FIG. 9 is a block diagram of an example implementation of the demographics estimator 140 that is to calculate the scaling values or weights (e.g., granular data) for demographic constraints of interest to correct for non-count or under-representation of impressions for the target region 602 of FIG. 6. As illustrated in FIG. 9, the example demographics estimator 140 includes the example target region determiner 202, the example source region determiner 204, the example constraint importance determiner 206, and the example target region calculator 208. The target region determiner 202, the source region determiner 204, the constraint importance determiner 206, and the target region calculator 208 of FIG. 9 are substantially similar to or identical to those components having the same reference numbers in FIG. 2. Those components are described above in further detail in connection with FIG. 2 and will not be described in detail again.

The target region determiner 202 of the illustrated example determines aggregate demographics data 902 of the example target region 602 (e.g., a population). For example, the target region determiner 202 collects the aggregate demographics data 902 that is based on demographics data of a database proprietor from the example target region demographics database 134 of FIG. 6. For example, the example aggregate demographics data 902 collects the example aggregate demographics data 902 in vector form.

Elements of the example aggregate demographics data 902 correspond to demographic constraints of interest. For example, an element of a first row of the example aggregate demographics data 902 corresponds with a "male" demographic constraint and an element of a second row corresponds with a "female" demographic constraint. The elements of the example aggregate demographics data 902 represent quantities (e.g., counts, percentages) of the target region 102 that match, belong to and/or satisfy the corresponding demographics of interest. For example, the element of the first row of the example aggregate demographics data 902 indicates that 10 recorded impressions of the target region 602 were associated with the "male" constraint, and 15 recorded impressions of the target region 602 were associated with the "female" constraint.

Further, the example target region determiner 202 determines aggregate impressions data 904 (e.g., aggregate behavioral data) of the example target region 602 (e.g., a population). For example, the target region determiner 202 collects the aggregate tuning data 212 that is based on the example impressions data 612a, 612b, 612c, 612d of the example households 606a, 606b, 606c, 606d of the target region 602 from the example target region behavioral database 136 of FIG. 6. In the illustrated example, the aggregate impression data 904 determined by the target region determiner 202 indicates that there were 50 recorded impressions for the example target region 602. Thu, the aggregate demographics data 902 and the aggregate impressions data 904 of the illustrated example indicate that 50% of the impressions (e.g., 25 impressions associated with a demographic constraint of the 50 total impressions) of the target region 602 are not associated with a demographic constraint (e.g., are non-counts or under-representations).

The source region determiner 204 of the illustrated example determiners granular data 214 of the example source region 604 of FIG. 6. For example, the source region determiner 204 collects the granular data 906 that is based on impressions data (e.g., the example impressions data 612c, 612d of FIG. 6) and demographics data (e.g., the example demographics data 614a, 614b, 614c of FIG. 6) of panelist households (e.g., the example households 606a, 606b of FIG. 6) of the source region 604 (e.g., the panelist sub-region of the population) from the example source region database 138 of FIG. 6.

As illustrated in FIG. 9, the example source region determiner 204 collects the example granular data 906 in vector form. In the illustrated example, rows of the granular data 906 collected by the source region determiner 204 correspond to behavioral constraints of interest. The demographic constraints of the example granular data 214 are the same demographic constraints of the example aggregate demographics data 902. For example, a first row of the granular data 214 corresponds with a "male" constraint, and a second row corresponds with a "female" constraint.

Elements of the granular data 214 collected by the source region determiner 204 represent scaling values or weights that are inverses of percentages of recorded impressions associated with demographic constraints that are recorded for those demographic constraints. For example, the data stored in the example source region database 138 indicate that 50% (e.g., 0.5 in decimal form) of impressions associated with the "male" constraint are recorded as being associated with the "male" constraint, and 75% (e.g., 0.75 in decimal form) of impressions associated with the "female" constraint are recorded as being associated with the "female" constraint. Thus, in such examples, the example granular data 906 determined by the example source region determiner 204 includes a scaling value or weight of '2' (i.e., the inverse of 0.5) in the first row associated with the "male" constraint and includes a scaling value or weight of '1.33' (i.e., the inverse of 0.75) in the second row associated with the "female" constraint.

The constraint importance determiner 206 of the illustrated example determines an importance matrix 908. The example importance matrix 216 includes values that represent weights for the behavioral constraints of interest. Because there is a single behavioral constraint of interest (e.g., impressions) in the illustrated example, the example importance matrix 908 includes a value of '1.'

In the illustrated example, the target region calculator 208 includes the example linear identifier 218, the example linear calculator 220, and the example non-linear calculator 222. The linear identifier 218, the linear calculator 220, and the non-linear calculator 222 of FIG. 9 are substantially similar to or identical to those components having the same reference numbers in FIG. 2. Those components are described above in further detail in connection with FIG. 2 and will not be described in detail again.

The example target region calculator 208 calculates the target region granular data 224 that includes scaling values or weights for the example target region 602 to account for non-counts or under-representations when determining quantities of impressions associated with the demographic constraints of interest. The target region calculator 208 of the illustrated example calculates the target region granular data 224 that includes a scaling value or weight of '2.3077' for the "male" demographic constraint and a scaling value or weight of '1.7949' for the "female" demographic constraint. To compensate for non-count or under-representation of impressions, the example target region calculator 208 applies (e.g., multiplies, scales up) the calculated weights to the aggregate demographics data 902 to determine quantities (e.g., counts, percentages) of the total impression count of the example aggregate impression data 904 that are recorded for the demographic constraints of interest. For example, the target region calculator 208 multiplies '2.3077' by '10' to determine that about 23 of the 50 impressions of the target region 602 are associated with males and multiplies '1.7949' by '15' to determine that about 27 of the 50 impressions of the target region 602 are associated with females.

Thus, the example demographics estimator 140 of FIGS. 6 and/or 9 enables the example AME 106 or other entity to calculate the granular data 224 of the example target region 602 based on the example aggregate demographics data 902 and the example aggregate tuning data 902 of the target region 602, thereby reducing an amount of data collected from the target region 602 by computer networked data collection systems. As a result, the example demographics estimator 140 enables the example AME 106 or other entity to overcome non-count or under-representation of impressions when determining portions of recorded impressions for online activity that are associated with demographic constraints of interest.

Figure 10:
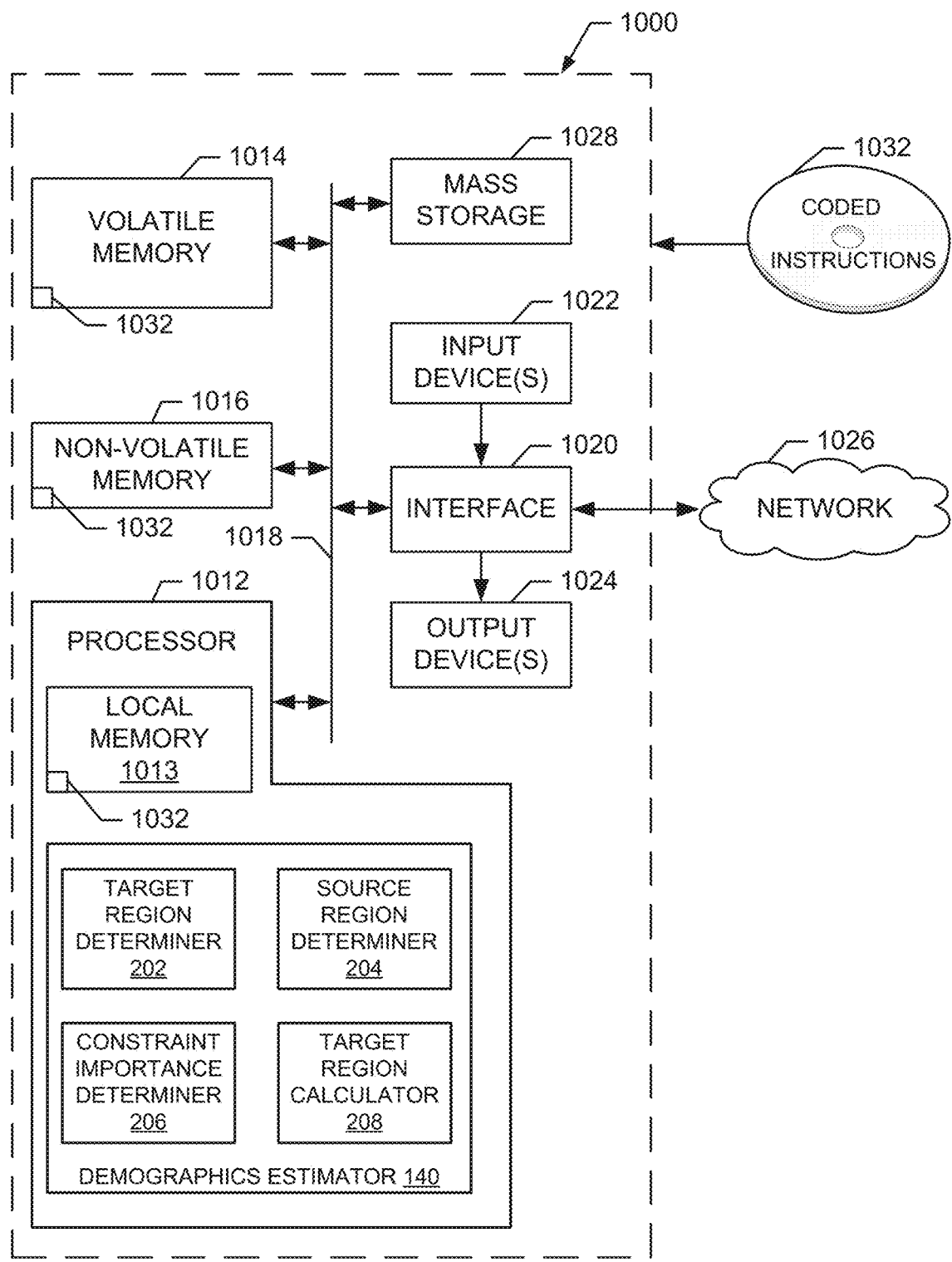
FIG. 10 is a block diagram of an example processor system structured to execute the example machine readable instructions represented by FIGS. 3, 4, and/or 5 to implement the demographics estimator of FIGS. 1, 2, 6 and/or 9.

FIG. 10 is a block diagram of an example processor platform 1000 structured to execute the instructions of FIGS. 3, 4, and/or 5 to implement the demographics estimator 140 of FIGS. 1, 2, 6 and/or 9. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The processor 1012 of the illustrated example includes the example target region determiner 202, the example source region determiner 204, the example constraint importance determiner 206, the example target region calculator 208 and/or, more generally, the demographics estimator 140.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

Coded instructions 1032 of FIGS. 3, 4, and/or 5 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture enable an audience measurement entity to calculate granular data of a target region based on aggregate data of the target region and granular data of a source region, thereby reducing computer memory and computer processing resources of computer networked data collection systems utilized for collecting data of the target region. For example, the above disclosed methods, apparatus and articles of manufacture enable the audience measurement entity to calculate the granular data of the target region without having to implement complex processes of gathering detailed behavioral and demographics data from regions with small populations.

Further, the above disclosed methods, apparatus and articles of manufacture enable an audience measurement entity to calculate granular exposure data of a non-panelist region based on tuning data collected from households of the non-panelist region (e.g., tuning events collected via computerized media presentation devices connected to a computer network to facilitate collection of the tuning events). Additionally or alternatively, the above disclosed methods, apparatus and articles of manufacture enable an audience measurement entity to calculate granular impressions data for online activity of a population including non-panelists based on aggregate impressions data (e.g., recorded online activity collected via computerized media presentation devices connected to a computer network that facilitates presentation of media) of the population.

Thus, it will be appreciated that the above disclosed methods, apparatus and articles of manufacture reduce processing resource utilization by computing a measurement of a media audience of the target region without collecting person-specific data from the members of the target region and using the data collected from the computerized media presentation devices via the computer network.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to determine an audience count of a target region, the apparatus comprising:
   a target region determiner to:
      determine aggregate behavioral data associated with media audience measurement of the target region, the aggregate behavioral data satisfying a behavioral constraint, the behavioral constraint corresponding to exposure to a media event; and
      determine aggregate demographics data of the target region, the aggregate demographics data associated with a first demographic constraint and a second demographic constraint;
   a source region determiner to determine granular data of a source region, the granular data including first source region members that satisfy the behavioral constraint and the first demographic constraint and second source region members that satisfy the behavioral constraint and the second demographic constraint; and
   a target region calculator to determine the audience count of the media event in the target region by apportioning the aggregate behavioral data among the first demographic constraint and the second demographic constraint, the apportioning based on (a) the aggregate demographics data of the target region and (b) the granular data of the source region.

2. The apparatus as defined in claim 1, wherein the target region calculator is to determine the audience count of the media event in the target region based on a first weight corresponding to a value of the first demographic constraint and a second weight corresponding to a value of the second demographic constraint.

3. The apparatus as defined in claim 1, further including:
   a linear identifier to determine if there is a linear relationship between the aggregate demographics data and the aggregate behavioral data;
   a linear calculator to calculate, in response to determining the linear relationship, the audience count of the media event of the target region based on the linear relationship; and
   a non-linear calculator to calculate, in response to determining no linear relationship, the audience count of the media event of the target region by performing non-linear optimization based on the granular data, the aggregate demographics data, and the aggregate behavioral data.

4. The apparatus as defined in claim 3, wherein the non-linear calculator is to define an optimization constraint based on the aggregate behavioral data and the aggregate demographics data, the non-linear optimization being limited by the optimization constraint.

5. The apparatus as defined in claim 3, wherein the non-linear calculator is to calculate an optimization parameter that indicates a variance based on the granular data of the source region and the audience count of the target region.

6. The apparatus as defined in claim 1, wherein the source region includes panelist households and the target region does not include panelists households, the source region determiner to determine the granular data based on exposure data from the panelist households.

7. The apparatus as defined in claim 1, wherein the first demographic constraint and the second demographic constraint are mutually exclusive.

8. A non-transitory computer readable storage medium comprising instructions which, when executed, cause a processor to at least:
   determine aggregate behavioral data associated with media audience measurement of a target region, the aggregate behavioral data satisfying a behavioral constraint, the behavioral constraint corresponding to exposure to a media event; and
   determine aggregate demographics data of the target region, the aggregate demographics data associated with a first demographic constraint and a second demographic constraint;
   determine granular data of a source region, the granular data including first source region members that satisfy the behavioral constraint and the first demographic constraint and second source region members that satisfy the behavioral constraint and the second demographic constraint; and
   determine an audience count of the media event in the target region by apportioning the aggregate behavioral data among the first demographic constraint and the second demographic constraint, the apportioning based on (a) the aggregate demographics data of the target region and (b) the granular data of the source region.

9. The non-transitory computer readable storage medium as defined in claim 8, wherein the instructions cause the processor to determine the audience count of the media event in the target region based on a first weight corresponding to a value of the first demographic constraint and a second weight corresponding to a value of the second demographic constraint.

10. The non-transitory computer readable storage medium as defined in claim 8, wherein the instructions further cause the processor to:
    determine if there is a linear relationship between the aggregate demographics data and the aggregate behavioral data;
    calculate, in response to determining the linear relationship, the audience count of the media event of the target region based on the linear relationship; and
    calculate, in response to determining no linear relationship, the audience count of the media event of the target region by performing non-linear optimization based on the granular data, the aggregate demographics data, and the aggregate behavioral data.

11. The non-transitory computer readable storage medium as defined in claim 10, wherein the instructions further cause the processor to define an optimization constraint based on the aggregate behavioral data and the aggregate demographics data, the non-linear optimization being limited by the optimization constraint.

12. The non-transitory computer readable storage medium as defined in claim 10, wherein the instructions further cause the processor to calculate an optimization parameter that indicates a variance based on the granular data of the source region and the audience count of the target region.

13. The non-transitory computer readable storage medium as defined in claim 8, wherein the source region includes panelist households and the target region does not include panelists households, and the instructions further cause the processor to determine the granular data based on exposure data from the panelist households.

14. The non-transitory computer readable storage medium as defined in claim 8, wherein the first demographic constraint and the second demographic constraint are mutually exclusive.

15. A method to determine an audience count of a target region, the method comprising:
    determining aggregate behavioral data associated with media audience measurement of the target region, the aggregate behavioral data satisfying a behavioral constraint, the behavioral constraint corresponding to exposure to a media event; and
    determining aggregate demographics data of the target region, the aggregate demographics data associated with a first demographic constraint and a second demographic constraint;
    determining granular data of a source region, the granular data including first source region members that satisfy the behavioral constraint and the first demographic constraint and second source region members that satisfy the behavioral constraint and the second demographic constraint; and
    determining the audience count of the media event in the target region by apportioning the aggregate behavioral data among the first demographic constraint and the second demographic constraint, the apportioning based on (a) the aggregate demographics data of the target region and (b) the granular data of the source region.

16. The method as defined in claim 15, wherein determining the audience count of the media event in the target region is further based on a first weight corresponding to a value of the first demographic constraint and a second weight corresponding to a value of the second demographic constraint.

17. The method as defined in claim 15, further including:
    determining if there is a linear relationship between the aggregate demographics data and the aggregate behavioral data;
    calculating, in response to determining the linear relationship, the audience count of the media event of the target region based on the linear relationship; and
    calculating, in response to determining no linear relationship, the audience of the media event of the target region by performing non-linear optimization based on the granular data, the aggregate demographics data, and the aggregate behavioral data.

18. The method as defined in claim 17, further including defining an optimization constraint based on the aggregate behavioral data and the aggregate demographics data, the non-linear optimization being limited by the optimization constraint.

19. The method as defined in claim 17, further including calculating an optimization parameter that indicates a variance based on the granular data of the source region and the audience count of the target region.

20. The method as defined in claim 15, wherein the source region includes panelist households and the target region does not include panelists households, and further including determining the granular data based on exposure data from the panelist households.

* * * * *